(12) United States Patent
Katoh et al.

(10) Patent No.: US 10,809,946 B2
(45) Date of Patent: Oct. 20, 2020

(54) ARRAY CONTROL PROGRAM, ARRAY CONTROL METHOD, AND ARRAY CONTROL APPARATUS

(71) Applicant: FUJITSU LIMITED, Kawasaki-shi, Kanagawa (JP)

(72) Inventors: Takashi Katoh, Kawasaki (JP); Keisuke Goto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/176,010

(22) Filed: Oct. 31, 2018

(65) Prior Publication Data

US 2019/0138250 A1     May 9, 2019

(30) Foreign Application Priority Data

Nov. 8, 2017 (JP) .................................. 2017-215461

(51) Int. Cl.
    *G06F 3/06*     (2006.01)

(52) U.S. Cl.
    CPC .......... *G06F 3/0689* (2013.01); *G06F 3/0604* (2013.01); *G06F 3/064* (2013.01); *G06F 3/0631* (2013.01); *G06F 3/0646* (2013.01)

(58) Field of Classification Search
    CPC ...... G06F 3/0689; G06F 3/0646; G06F 3/064; G06F 3/0604; G06F 3/061; G06F 3/0688
    See application file for complete search history.

(56) References Cited

U.S. PATENT DOCUMENTS

| 10,331,369 | B2 * | 6/2019 | Katoh | ................... G06F 3/0604 |
| 2007/0294492 | A1 * | 12/2007 | Rudelic | ................... G06F 3/061 |
| | | | | 711/156 |
| 2008/0276036 | A1 | 11/2008 | Van et al. | |

FOREIGN PATENT DOCUMENTS

| JP | H05-158783 | 6/1993 |
| JP | 2002-207634 | 7/2002 |
| JP | 2004-030353 | 1/2004 |
| JP | 2009-521049 | 5/2009 |

OTHER PUBLICATIONS

Aho et al., "The Design and Analysis of Computer Algorithms" Addison-Wesley, 1974 (14 pages).
Navarro, "Dynamic Dictionaries in Constant Worst-Case Time" Technical Report TR/DCC-2007-11, University of Chile, Department of Computer Science, Oct. 2007 (16 pages).

* cited by examiner

*Primary Examiner* — Hiep T Nguyen
(74) *Attorney, Agent, or Firm* — Fujitsu Patent Center

(57) ABSTRACT

An optional array in a memory includes an array having blocks each including an address word and a data word, and a boundary that is a position where a ratio between the numbers of unwritten blocks in M area and written blocks in W area is an integer ratio. The controlling process includes when a second write for writing a special value in a written block in the second area is invoked, executing a shrink process of shifting the boundary to shrink the first area; in a case where the first adjacent block at the boundary is a written block, storing an address of the first adjacent block and of a first link destination block forming a link with the write destination block in address words of the first link destination block and of the first adjacent block respectively to form a link.

12 Claims, 39 Drawing Sheets

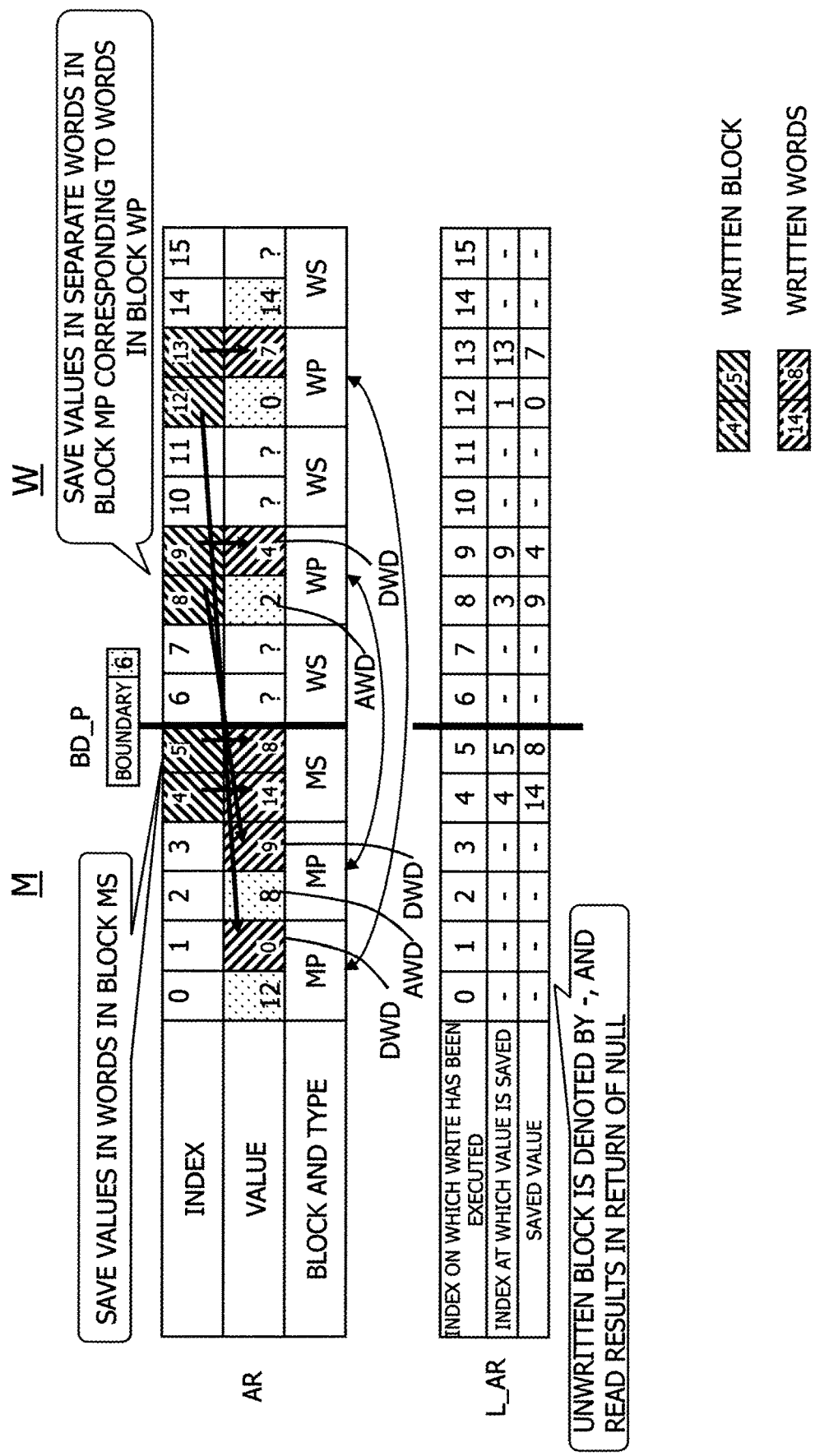

FIG. 6 initialize (x)

| BOUNDARY | BD_P |
|---|---|
| | 0 |

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | ? | ? | ? | ? | ? | ? | ? | ? | ? | ? | ? | ? | ? | ? | ? | ? |
| BLOCK AND TYPE | WS | | WS | | WS | | WS | | WS | | WS | | WS | | WS | |

BIDIRECTIONAL LINKS ARE ELIMINATED AND ALL BLOCKS ARE OF WS TYPE

AR

W

FIG. 9 unlink(i)

FIG. 19 write(i, v)  i IS EVEN NUMBER, v=NULL    WN1

IN CASE WHERE B1 WITH INDEX i IS OF MP OR WS TYPE (MP OR WS IN S71)
BLOCK B1 IS ORIGINALLY UNWRITTEN BLOCK, AND THUS, NOTHING IS DONE

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 12 | 0 | | | 8 | 12 | | | 4 | 12 | | | 12 | 0 | | |
| BLOCK AND TYPE | MS | | | | MP | | | | WP | | | | WS | | | | write(4,NULL)

write(12,NULL)

write(i, v) i IS EVEN NUMBER, v=NULL  WN2-3

IN CASE WHERE B1 IS OF MS TYPE: SET, AS B2, BLOCK IN M AREA ADJACENT TO BOUNDARY
 IN CASE WHERE BLOCK B2 IS DIFFERENT FROM BLOCK B1 (NO IN S74)
 IN CASE WHERE B2 IS OF MP TYPE (MP IN S77): SET, AS B4, BLOCK ASSOCIATED WITH B2
  SHIFT BOUNDARY TO SHRINK M AREA BY ONE BLOCK (S76)
  SHIFT VALUE OF DATA WORD OF B2 TO DATA WORD OF B1 (S80)
  ASSOCIATE B1 WITH B4 (S80)

write(i, v) i IS EVEN NUMBER, v=NULL    WN3-2

IN CASE WHERE B1 IS OF WP TYPE:
SET, AS B2, BLOCK IN M AREA ADJACENT TO BOUNDARY, AND SET, AS B3, BLOCK ASSOCIATED WITH B1
IN CASE WHERE BLOCK B2 IS DIFFERENT FROM BLOCK B3 (NO IN S82)
IN CASE WHERE B2 IS OF MS TYPE (MS IN S83)
SHIFT BOUNDARY TO SHRINK M AREA BY ONE BLOCK (S76)
SHIFT VALUE OF ADDRESS WORD OF B2 TO DATA WORD OF B3 TO ASSOCIATE B2 WITH B3 (S84)

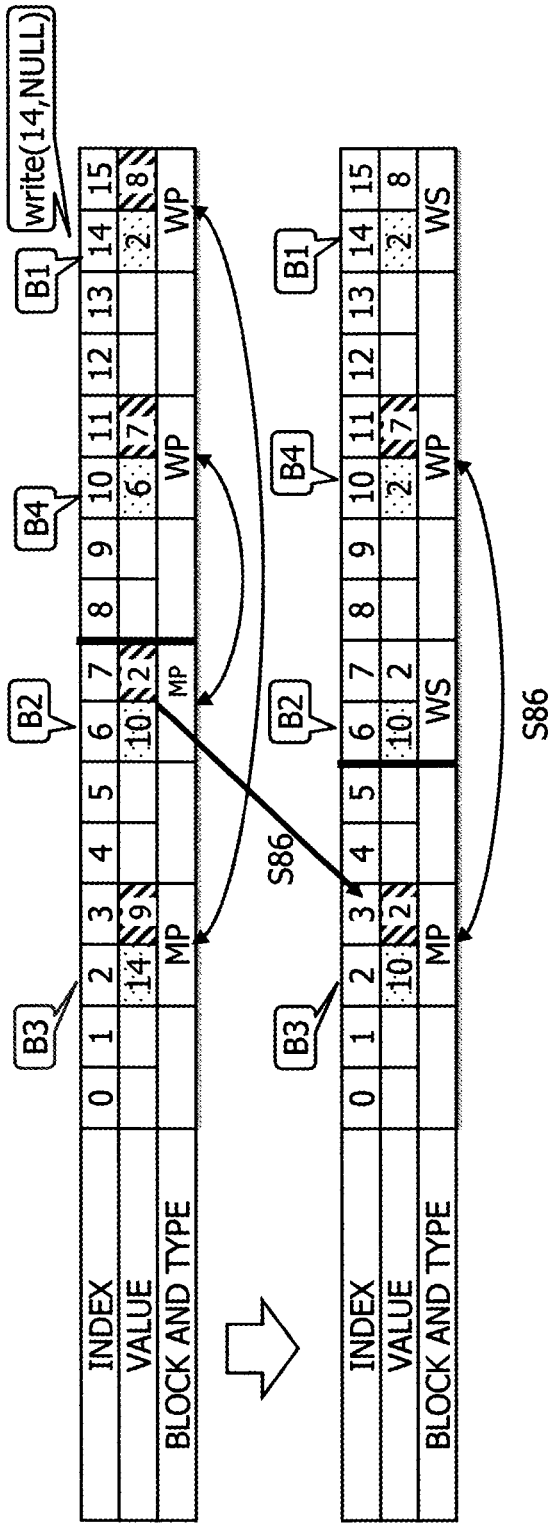

FIG. 26

ARRAY THAT HAS LENGTH OF 16 AND IN WHICH 1 BLOCK = 2 WORDS

ALL VALUES ARE UNDEFINED IN INITIAL STATE

AR0

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 8 | 2 | 11 | 3 | 0 | 4 | 4 | 12 | 9 | 2 | 5 | 8 | 7 | 1 | 6 |
| BLOCK AND TYPE | MS | | MS | | MS | | MS | | MP | | MS | | WP | | WS | |

BD_P

| BOUNDARY POINTER |
|---|
| 12 |

TYPE OF BLOCK CAN BE CALCULATED IN CONSTANT TIME BASED ON VALUES OF INDEX, BOUNDARY POINTER, AND ADDRESS WORD. TYPE IS NOT ACTUALLY SAVED initialize(0) // SET ALL BLOCKS TO NULL (WS) 

S1 REWRITE BOUNDARY POINTER

AR1

BD

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 8 | 2 | 11 | 3 | 0 | 4 | 4 | 12 | 9 | 2 | 5 | 8 | 7 | 1 | 6 |
| BLOCK AND TYPE | WS | | WS | | WS | | WS | | WS | | WS | | WS | | WS | |

BD_P

| BOUNDARY POINTER |
|---|
| 0 |

BOUNDARY POINTER IS SET TO 0, AND THUS, ALL BLOCKS ARE OF WS TYPE

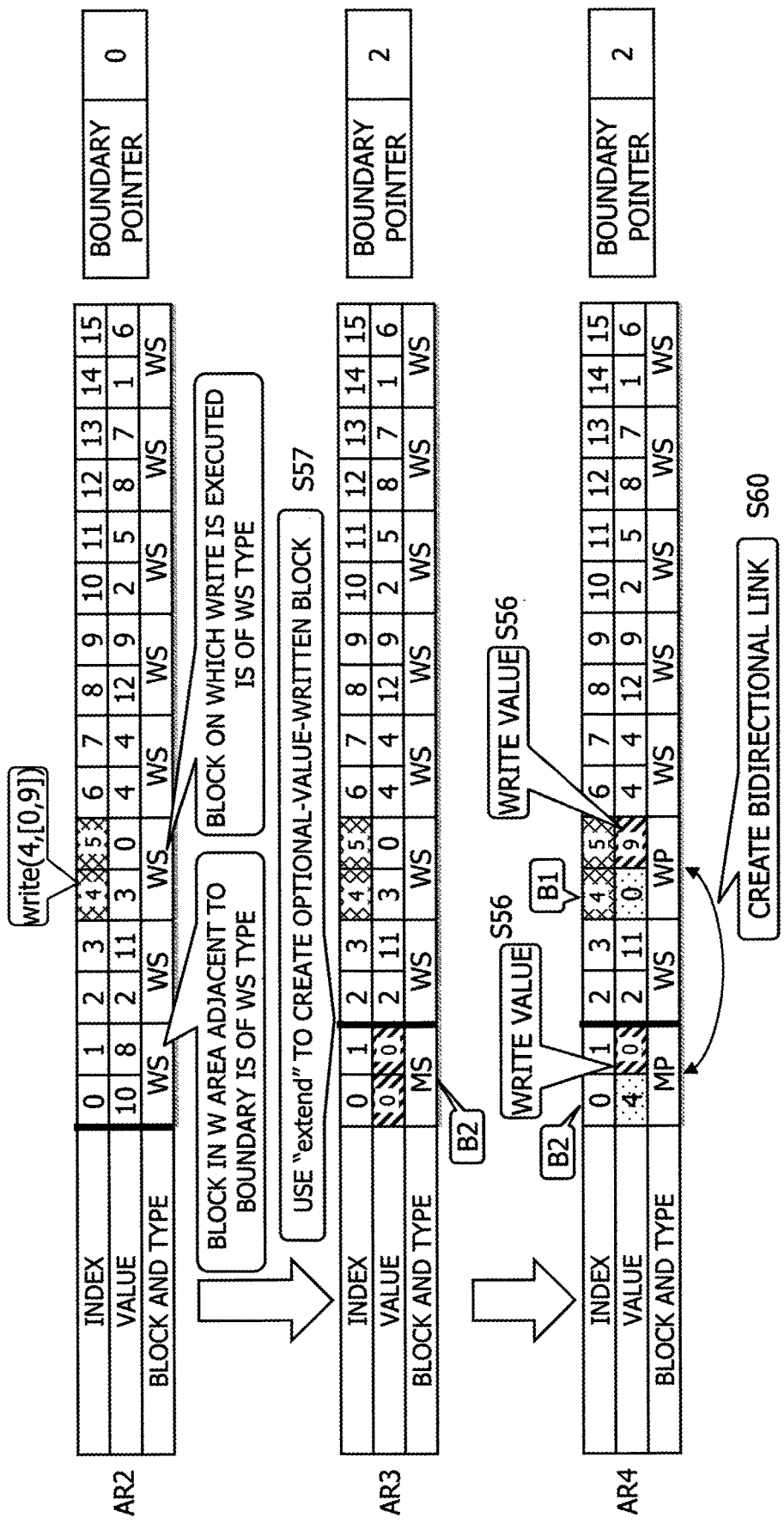

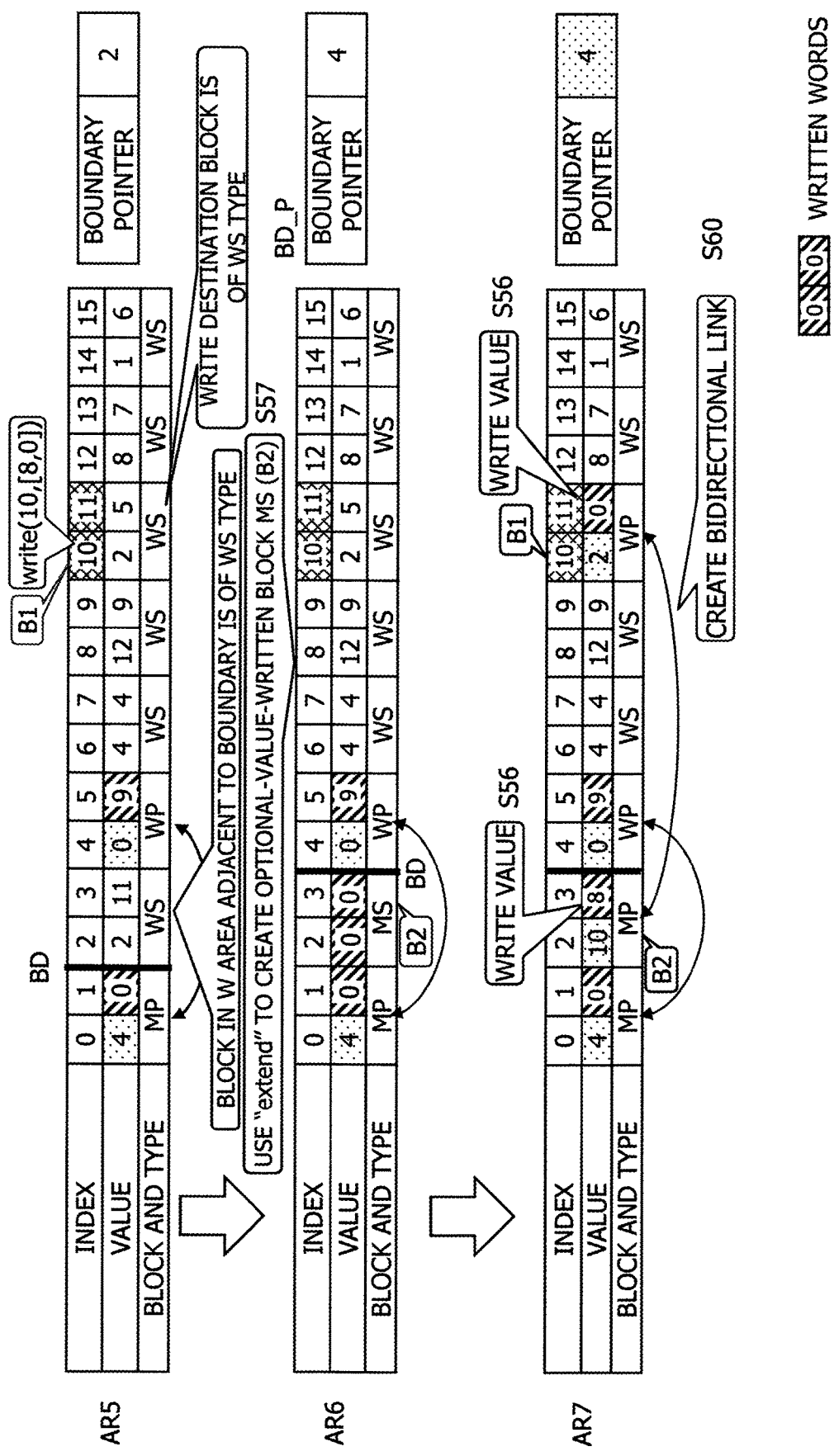

FIG. 32 read(0) // READ INDEX 0

AR19

Output=NULL

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 1 | 14 | 0 | 8 | 9 | 10 | 0 | 8 | 9 | 0 | 0 | 8 | 7 | 14 | 6 |
| BLOCK AND TYPE | MP | MP | MS | MS | MS | MS | MS | MS | WS | WS | WP | WP | WS | WS | WS | WS |

| BOUNDARY POINTER |
|---|
| 8 |

BLOCK ON WHICH READ IS EXECUTED IS OF MP TYPE → MP IN S21 read(2) // READ INDEX 2

AR20

Output=[14,0]

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 1 | 14 | 0 | 8 | 9 | 10 | 0 | 8 | 9 | 0 | 0 | 8 | 7 | 14 | 6 |
| BLOCK AND TYPE | MP | MP | MS | MS | MS | MS | MS | MS | WS | WS | WP | WP | WS | WS | WS | WS |

| BOUNDARY POINTER |
|---|
| 8 |

BLOCK ON WHICH READ IS EXECUTED IS OF MS TYPE → MS IN S21 read(8) // READ INDEX 8

AR21

Output=NULL

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 1 | 14 | 0 | 8 | 9 | 10 | 0 | 8 | 9 | 0 | 0 | 8 | 7 | 14 | 6 |
| BLOCK AND TYPE | MP | MP | MS | MS | MS | MS | MS | MS | WS | WS | WP | WP | WS | WS | WS | WS |

| BOUNDARY POINTER |
|---|
| 8 |

BLOCK ON WHICH READ IS EXECUTED IS OF WS TYPE → WS IN S21

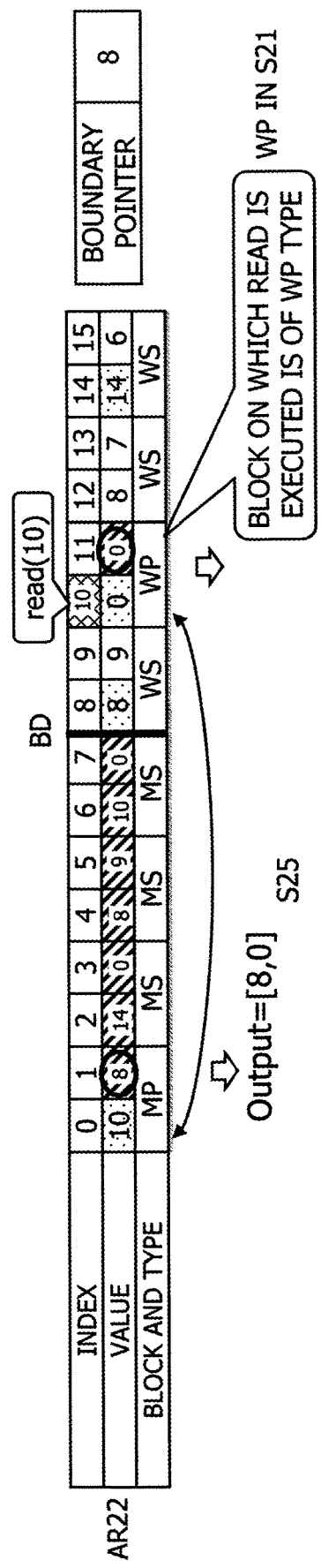

FIG. 34 write(10,NULL) // WRITE NULL TO INDEX 10

FIG. 35

(1) DATA TO BE EXPRESSED

FF AC 00 00 [NULL] 00 B1 E7 BE FF [NULL] FF A6 [NULL] ～ MAIN AREA (2) FLAG

FF AC 00 00 00 00 B1 E7 BE FF 00 FF A6 00 ～ MAIN AREA
0  0  0  0  1  0  0  0  0  0  1  0  0  1 ～ FLAG (3) ESCAPE ([NULL] → FF 00, FF → FF FF)

| FF FF | AC 00 00 00 | FF 00 | 00 B1 E7 BE | FF FF | FF 00 | FF FF A6 00 | FF 00 | ～ MAIN AREA

FIG. 36

ADDITIONAL MEMORY CAPACITY

| ELEMENT SIZE | ARRAY LENGTH | FLAG | ESCAPE (WORST CASE) | PRESENT EMBODIMENT |
|---|---|---|---|---|
| 8 bit | 1,000 | 1,000 bit | 8,000 bit | 252 bit* |
| 32 bit | 1,000 | 1,000 bit | 32,000 bit | 16 bit |
| 32 bit | 60,000 | 60,000 bit | 1920,000 bit | 16 bit |
| 32 bit | 100,000 | 100,000 bit | 3200,000 bit | 32 bit* |

OPTIONAL ARRAY WITH EXTRA SPACE OF m/2 BITS AND ARRAY LENGTH OF UP TO $N \leq 2^{\wedge}(m/2)$ FOR m-BIT ELEMENTS (ARRAY IN WHICH ONE ELEMENT HAS $2^{\wedge}m + 1$ STATES)

*IF ARRAY LENGTH IS LARGER THAN $2^{\wedge}(m/2)$, m/2 BITS ARE USED FOR EACH LENGTH OF $2^{\wedge}(m/2)$

ARRAY CONTROL PROGRAM, ARRAY CONTROL METHOD, AND ARRAY CONTROL APPARATUS

CROSS-REFERENCE TO RELATED APPLICATION

This application is based upon and claims the benefit of priority of the prior Japanese Patent Application No. 2017-215461, filed on Nov. 8, 2017, the entire contents of which are incorporated herein by reference.

FIELD

The present invention relates to an array control program, an array control method, and an array control apparatus.

BACKGROUND

An array is a basic data structure used for data aggregation and the like. The array has a storage area (main area) in which values as data are stored in association with indices. When read and write are executed on indices 0≤i<N and read is executed on a certain index i, the array returns the last value written to the main area at the index i. Normal initialization of the array involves an initialization process in which an initial value is written to the main area at all the indices. This leads to the need for an initialization time proportional to an array size N.

On the other hand, in a data structure referred to as an initializable array, all the indices 0≤i<N are set to the initial value when, in addition to the above-described read and write, initialization is performed. The initializable array is configured to specially support the initialization and performs an initialization process in a given time regardless of the array size N. For example, a technique for a word random-access machine (RAM) model is known. In the technique, when initialization "initialize (x)" is invoked, an initial value x is stored. Management information is stored that indicates whether the write has been executed on each index i. When the read is invoked for an index on which no write has been executed, the initial value x stored during the initialization is returned.

Such a data structure for the initializable array is utilized, for example, when an application program that needs to operate in real time needs to execute the initialization process in a fixed time independently of the size N of the array. The data structure for the array is described in Japanese Laid-open Patent Publication Nos. H05-158783, 2002-207634, 2004-30353, and Japanese National Publication of International Patent Application No. 2009-521049, and A. Aho, J. Hoperoft, and J. Ullman, "The Design and Analysis of Computer Algorithms" Addition-Wesley, 1974, and 2 G. Navarro, "Dynamic dictionaries in constant worst-case time" Technical Report TR/DCC-2007-11, University of Chile, Department of Computer Science, October 2007.

SUMMARY

However, the conventional initializable array needs, in addition to the main area of the array, an extra space configured to store therein management information indicating whether or not the write has been executed on each index.

When elements of an initializable array are to be organized into an array including a special state other than normal data, such as "NULL" or "NONE" (such an array is hereinafter referred to as an optional array), a flag allowing distinction from the normal data is used for the elements of the array, or an escape process is executed to allow distinction based on a combination of normal data. Unfortunately, such a flag and an escape process may increase the storage capacity of the array.

A non-transitory computer readable storage medium storing therein an array control program causing a computer to execute a process, the process comprising:

obtaining an optional array from a memory, the optional array having an array and a boundary, the array consecutively forming a plurality of blocks each including a constant number of two or more words including at least an address word and a data word, the boundary indicating a two-division position where the plurality of blocks of the array is divided into divided areas, the boundary being a position where a ratio between the number of unwritten blocks in a first area of the divided areas and the number of written blocks in a second area of the divided areas is an integer ratio;

when a first write for writing a valid value to an unwritten block in the first area or an unwritten block in the second area is invoked, executing an extend process of shifting the boundary to extend the first area and generating an optional-value-written block in the first area;

in a case where a write destination block for the first write is not the same as the optional-value-written block generated by the extend process but is an unwritten block in the second area, executing a link process that includes storing an address of the write destination block in the second area, in an address word of the optional-value-written block in the first area generated by the extend process, and storing, in an address word of the write destination block in the second area, an address of the optional-value-written block in the first area generated by the extend process, to form a link; and writing the valid value to the write destination block in the second area;

when a second write for writing a special value in which a written block in the second area is the write destination block is invoked, executing a shrink process of shifting the boundary to shrink the first area, so as to shift, toward the second area side, a first adjacent block on the first area side adjacent to the boundary;

in a case where the first adjacent block is a written block, storing an address of the first adjacent block in an address word of a first link destination block forming a link with the write destination block, and storing an address of the first link destination block in an address word of the first adjacent block, to form a link, so as to eliminate an existing link of the write destination block to change the write destination block to an unwritten block; and in a case where the first adjacent block is an unwritten block, storing, in an address word of the first link destination block, an address of a second link destination block forming a link with the first adjacent block, and storing an address of the first link destination block in an address word of the second link destination block, to form a link, so as to eliminate an existing link of the write destination block to change the write destination block to an unwritten block.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating where the values in the array in FIG. 3 are saved.

FIG. 6 is a diagram illustrating the initialization process.

FIG. 19 is a diagram illustrating a NULL write process WN1.

FIG. 25 respectively illustrates NULL write processes WN3-3.

FIG. 26 illustrates a specific example of the array AR, and the initialization.

FIG. 27 is a diagram illustrating a specific example of the write W2-2 described in FIG. 16.

FIG. 28 is a diagram illustrating a specific example of the write W2-2 described for FIG. 16.

FIG. 32 is a diagram illustrating a specific example of three types of the read "read".

FIG. 33 is a diagram illustrating a specific example of one type of the read "read".

FIG. 34 is a diagram illustrating a specific example of the NULL write.

FIG. 35 is a diagram illustrating a data example where, besides valid values that are normal data, NULL, which is a special value, is stored in an array.

FIG. 36 is a diagram illustrating an additional memory capacity for storing the NULL state therein according to the embodiment.

DESCRIPTION OF EMBODIMENTS

Figure 1:
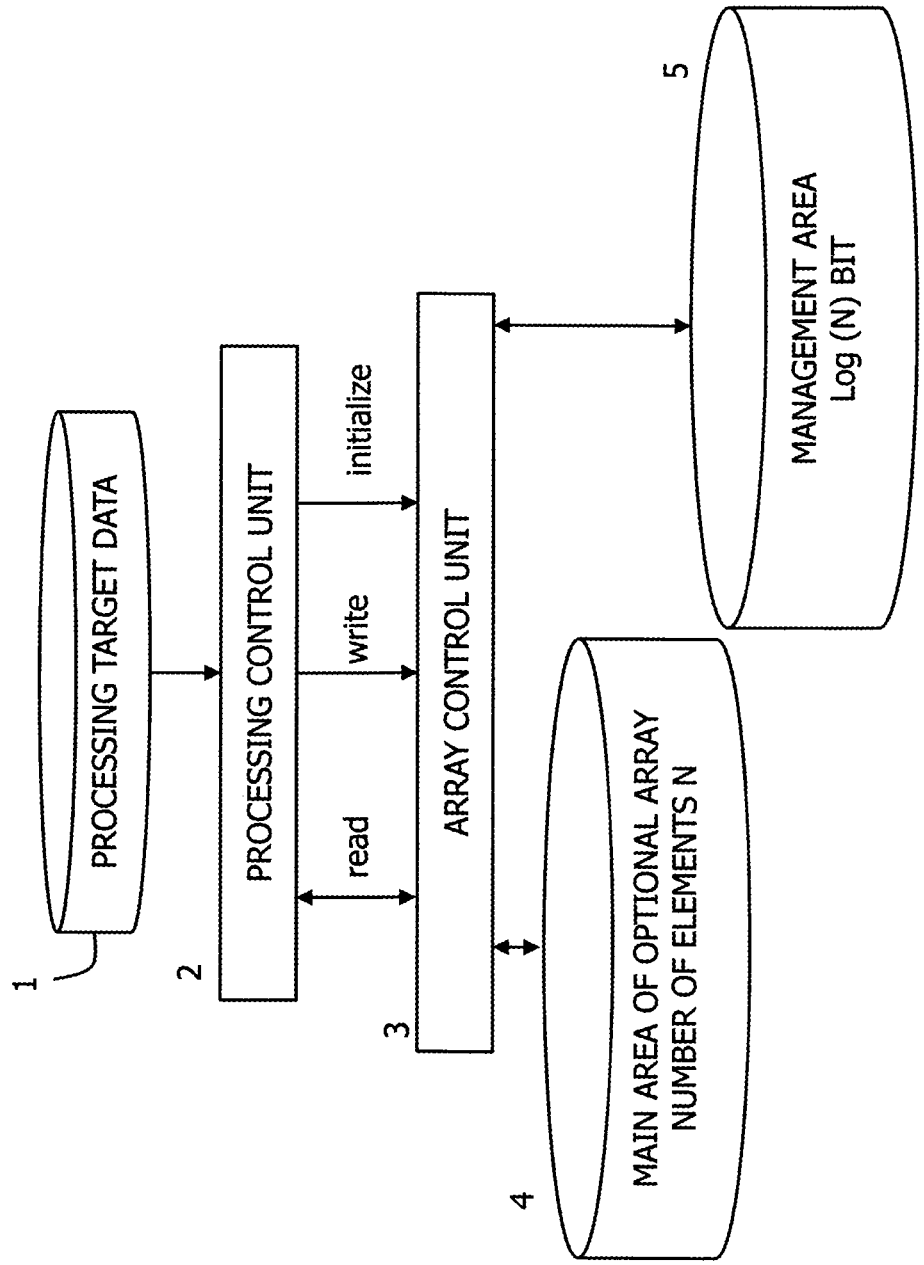
FIG. 1 is a diagram illustrating an example of an optional array and an array control program.

FIG. 1 is a diagram illustrating an example of an optional array and an array control program. FIG. 1 illustrates control preformed on the optional array by the array control program. A processing control unit 2 in FIG. 1 executes a predetermined process on processing target data 1, and in conjunction with the process, executes initialization, read, and write on an optional array 4. An array control unit 3 executes an initialization process, a write process, a read process, and the like on the array. The array 4 is provided with a management area 5 in which management information regarding written (or unwritten) elements of the array and the like is stored.

The array 4 is a storage apparatus such as a memory which stores therein data (values) of the elements of the array. The management area 5 is a storage apparatus such as a memory which stores therein the management information regarding the written (unwritten) elements.

The processing control unit 2 is constructed by a processor of a computer by executing a certain application program (hereinafter simply referred to as the application). The array control unit 3 is constructed by the processor by executing the array control program.

Figure 2:
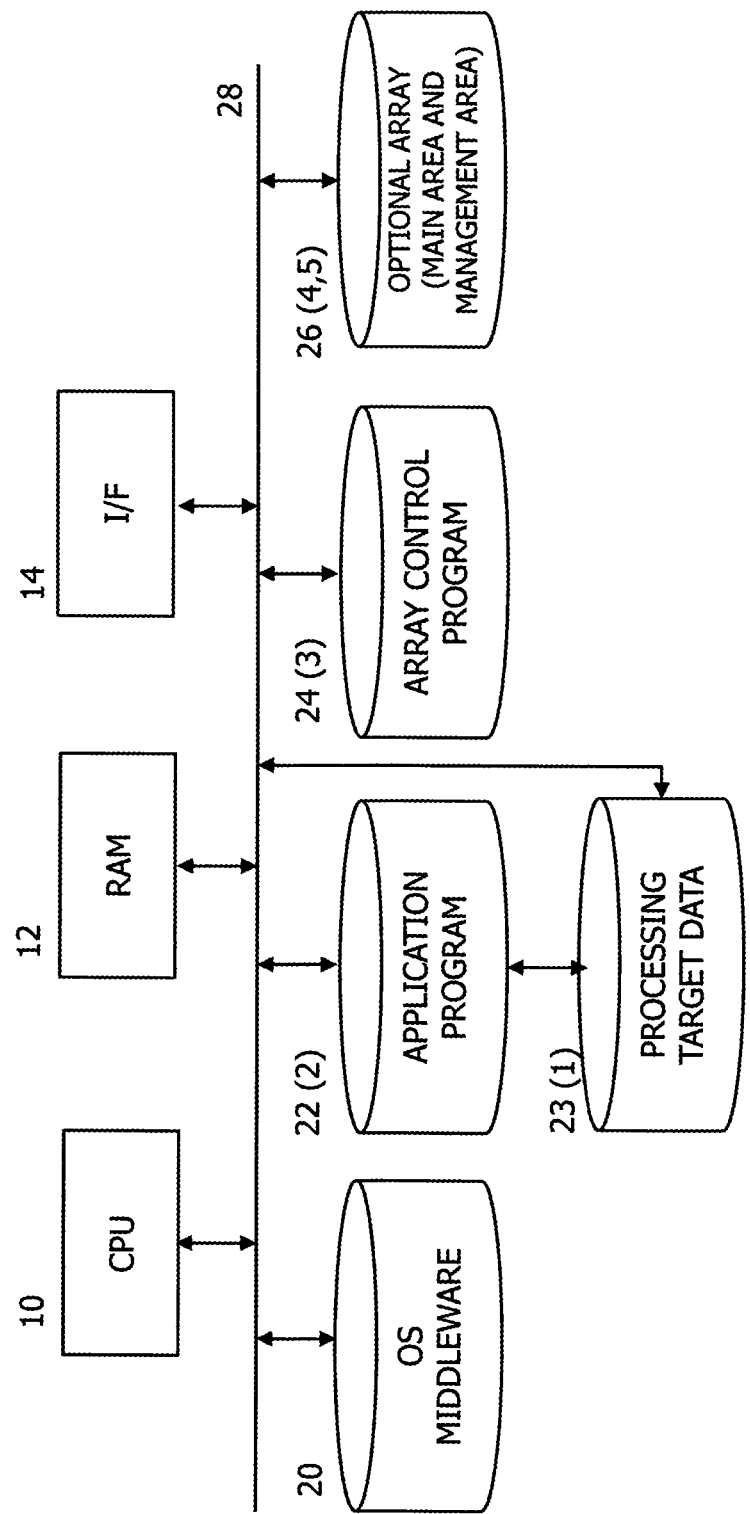
FIG. 2 is a diagram illustrating a configuration example of the array control apparatus.

FIG. 2 is a diagram illustrating a configuration example of the array control apparatus. The array control apparatus includes a central processing unit (CPU) 10 that is a processor, a main memory 12 such as a random-access memory (RAM) which is accessed by the CPU, and an interface 14 for an external apparatus. The CPU 10, the main memory 12, and the interface 14 are coupled together via a bus 28. The bus 28 is also provided with auxiliary mass-storage apparatuses 20 to 26 that are accessible to the CPU. The auxiliary storage apparatuses include a storage apparatus 20 storing therein an operating system (OS) that is a basic program and various types of middleware and storage apparatuses storing therein an application program (hereinafter referred to as the application) 22, processing target data 23, and an array control program 24. Moreover, the CPU executes the array control program 24 to perform an initialization process, a write process, or a read process instructed by the application 22 on an array stored in the storage apparatus 26. In addition to a main area of the array, a management area storing therein management data for the array is stored in the storage apparatus 26.

Now, the initializable array will be described based on an example. An array has a main area including a plurality of elements that stores data therein in association with indices. "Initialization" of the array means initialization of all the elements to an initial value. "Write" to the array means that the initialized elements are overwritten with write values. "Unwritten" means that the elements remain in an initialized state and have not been overwritten with the write values yet.

Figure 37:
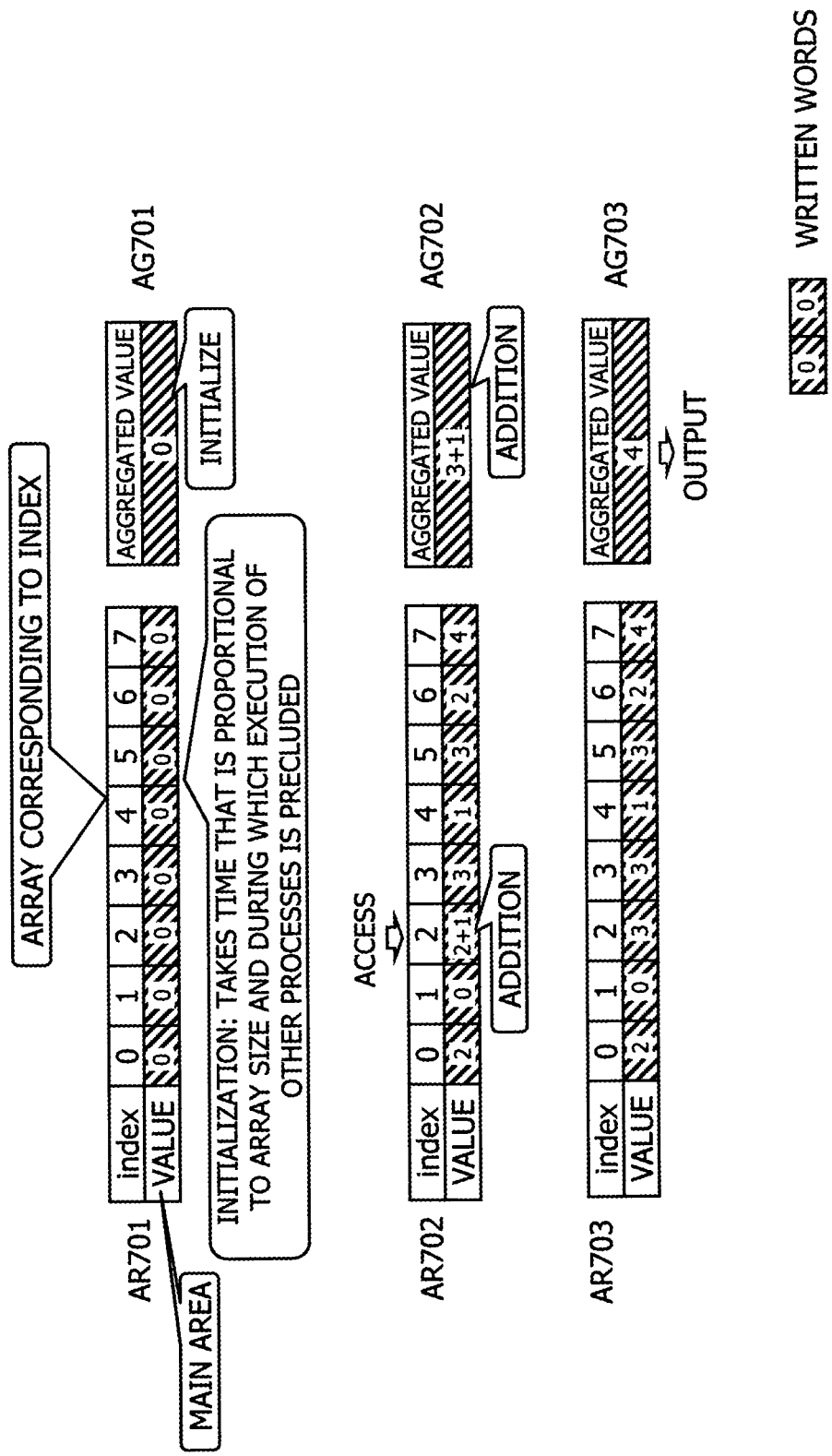
FIG. 37 is a diagram illustrating a first example.

FIG. 37 is a diagram illustrating a first example. An array AR has a main area including a plurality of elements that stores data (values) therein in association with indices. The array AR in FIG. 37 has, in the main area, eight elements corresponding to indices 0 to 7, respectively. In addition to the main area, the array AR has an aggregated value area AG in which a certain aggregated value is stored. For example, a processor is assumed to execute an application to aggregate, for eight users, the number of users who have accessed a server three or more times a day, in real time. In other words, the indices 0 to 7 in the array AR correspond to the eight users, and the number of accesses by each user is written to the corresponding element. The number of users with three or more accesses is stored in the aggregated value area AG as an aggregated value.

An array AR701 illustrates an initialized state. That is, in response to invocation for the initialization process by the application, the processor executes the array control program to write an initial value 0 (0 access) to all the elements of the array AR701, while writing an initial value 0 (0 people) to an aggregated value area AG701. In an array AR702, when a user corresponding to an index 2 gains access, the application adds one to the value "2" for the element with the index 2 and writes "3" to the element. At the same time, 1 is added to the value "3" in the aggregated value area AG701, and "4" is written to the element. Finally, at any requested timing, the application reads the value "4" in an aggregated value area AG703 corresponding to an array AR703. Then, at a predetermined timing each day, the array is initialized. The processor executes, based on the array control program, the initialization process and the read and write processes for the value for the element of the array as described above.

In the example in FIG. 37, in the initialization process, the initial value "0" needs to be written to all the indices. Therefore, the initialization process needs a time O (N) proportional to an array size N, precluding the write and read from being executed on the array during the initialization process. On the other hand, the read and write can be executed in a constant time O (1). The array in FIG. 37 is unsuitable for applications that record the number of accesses to the server in real time. The character "O" is the initial of order.

Figure 38A:
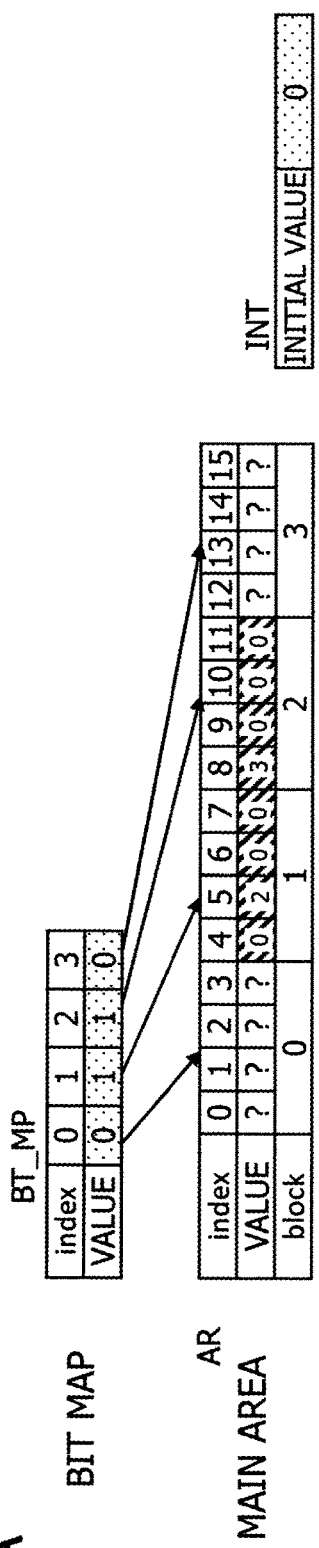
FIGS. 38A and 38B are diagrams illustrating two examples of the initializable array.
Figure 38B:
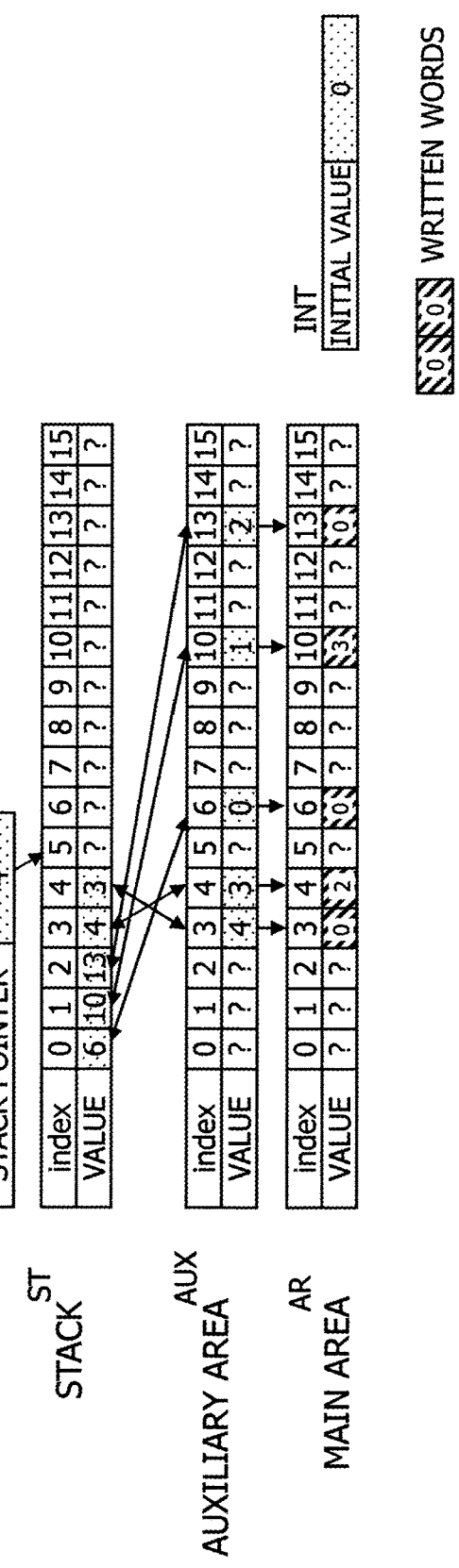

FIGS. 38A and 38B are diagrams illustrating two examples of the initializable array. The initializable array is a data structure that can be initialized at a high speed. Functions supported by the initializable array are as follows.
(1) For read "read(i)", a value for an element with an index i is returned.
(2) For write "write(i, x)", x is written to the element with the index i.
(3) For initialization "initialize(x)", x is written to elements with all the indices 0≤i<N.

Then, the processor executes the array control program, and when the initialization "initialize(x)" is invoked, simply stores therein the initial value x instead of writing the initial value x to all the elements in the array. The processor further stores therein management information indicating whether or not the write has been executed on each index. If the read "read(i)" for an index i to which no write has been executed is invoked, the processor returns the initial value x stored during the initialization. Consequently, the initialization is performed in a fixed time independently of the size N of the array.

In FIG. 38A, an array AR with N=16 elements with indices 0 to 15 is divided into blocks 0 to 3 each with four elements. The array AR has, as a management area, a bit map BT_MP that distinguishes between an unwritten state and a written state of each block and an initial value area INT in which an initial value for all the elements of the array is stored. When the processor executes the array control program and the initialization is invoked, the initial value "0" is written to the initial value area INT, and "0" is written to the bit map block. The initialization does not involve execution of write of the initial value to all the indices. When the write is invoked, a write value is written to a write destination index in the block, the initial value "0" is written to the remaining indices in the same block, and "1" indicative of the written state is written to a corresponding block in the bit map. The bit map stores therein "1" for written blocks and "0" for unwritten blocks so as to store therein management information on the written blocks and the unwritten blocks.

The array in FIG. 38A allows the initialization to be completed in a time O (N/log N) that is shorter than the time for the array in FIG. 37. However, the array in FIG. 38A needs to initialize the bit map BT_MP and thus needs, for the initialization, a time o (N) that depends on the array size N. The time o (N)=O (N/log N) means a time shorter than the time O (N), and log means a base 2 binary logarithm. However, since the management information includes the initial value area INT and the bit map BT_MP, an extra space for O (N/log N)=o (N) is needed for management. In other words, the bit map has elements for the respective blocks and thus needs the area o (N), which is smaller than the area O (N), which depends on the array size N.

The array in FIG. 38B has, in addition to an array AR with N=16 elements with indices 0 to 15, an auxiliary area AUX, a stack area ST, a stack pointer area ST_P, and an initial value area INT in which management information is stored. The auxiliary area and the stack area each have 16 elements. In this array, when the processor executing the array control program carries out write on certain indices in the array AR, the processor writes to the element in the auxiliary area that have the same indices as the write and to the minimum unwritten elements in the stack area and the indices vice versa to generate bidirectional links. Concurrently with the generation of bidirectional links, a stack pointer is updated to the index of the maximum write element.

In the example in FIG. 38B, in the array AR, write is executed on five elements with the five respective indices, and bidirectional links are generated between elements in the auxiliary area AUX that have the same five indices and elements in the stack area. For example, a value "0" is written to an index 3 in the array, and an index "3" in the auxiliary area is written to an index 4 in the stack area corresponding to a value "4" of an index 3 in the auxiliary area, which index is the same as the corresponding index in the array. Thus, bidirectional links are generated between the auxiliary area and the stack area. The value "4" of the stack pointer points to the maximum index of a set of indices in the stack area for which bidirectional links are generated.

When the read is invoked, the processor returns the value of a read destination index i in the array if the element in the auxiliary area that has the read destination index i forms bidirectional links, and otherwise returns the value in the initial value area INT.

For the array, when the initialization is invoked, the initial value "0" is written to the initial value area INT, and the minimum index "0" is written to the stack pointer ST_P. Therefore, the time needed for the initialization is the constant time O (1) independently of the array size N. However, the management area needs to be approximately 200% of the main area of the array, and the extra space corresponds to the O (N) that depends on the array size N.

Figure 39:
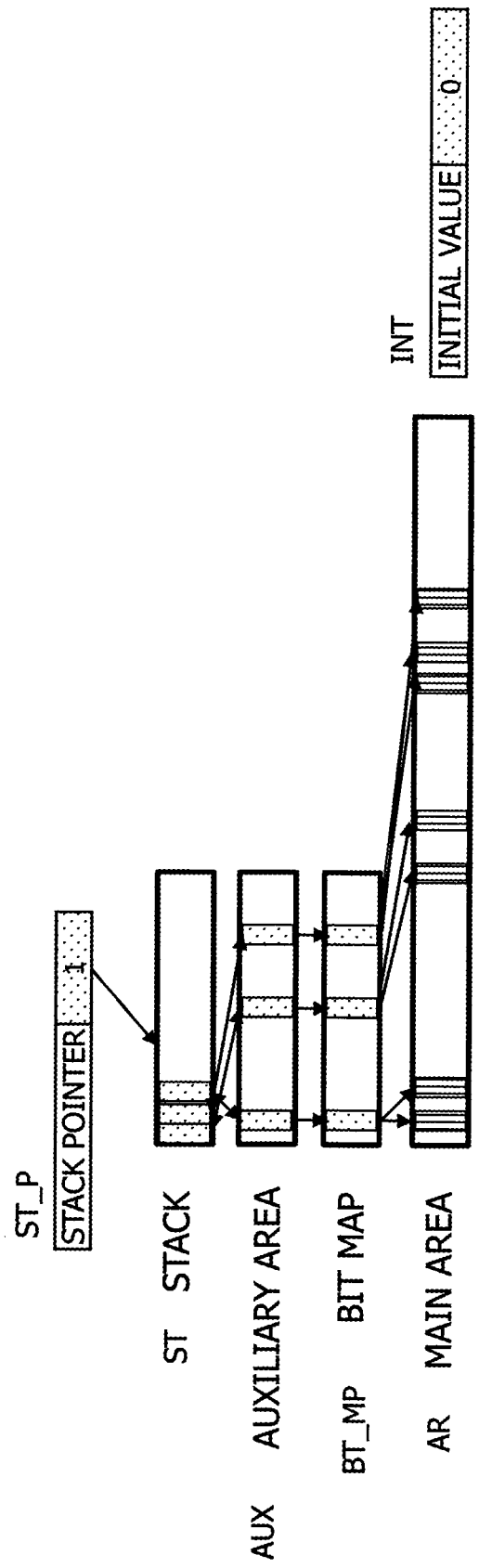
FIG. 39 illustrates an example of an array corresponding to hybridized two arrays in FIGS. 38A and 38B.

FIG. 39 illustrates an example of an array corresponding to hybridized two arrays in FIGS. 38A and 38B. In FIG. 39, a main area of an array AR and a bit map BT_MP similar to the main area and the bit map BT_MP in FIG. 38A are provided. For the bit map, an auxiliary area AUX, a stack ST, and a stack pointer ST_P similar to the auxiliary area AUX, stack ST, and stack pointer ST_P in FIG. 38B are provided. The bit map is smaller in size than the main area of the array AR, and thus correspondingly allows the management area to be reduced in size.

In this example, initialization can be performed in the constant time O (1). On the other hand, the management area in which management information is stored needs an extra space O (N/log N)=o (N). In general, the extra space is three times larger than the extra space needed for the bit map method in FIG. 38A.

FIG. 37, FIG. 38A, FIG. 38B, and FIG. 39 are summarized. For the array in FIG. 37, the initialization time depends on the array size N (O (N)), but the extra space for management has the constant size (O (1)). For the array in FIG. 38A, the initialization time is shorter than the time that depends on the array size N (O (N/log N)=o (N)), and this also applies to the extra space for management (O (N/log N)=o (N)). For the array in FIG. 38B, the initialization time is the constant time (O (1)), but the extra space for management has a size that depends on the array size N (O (N)). For the array in FIG. 39, the initialization time is the constant time (O (1)), and the extra space for management is smaller than the size that depends on the array size (O (N/log N)=o (N)).

[Optional Array in the First Embodiment]

The array in the present embodiment described below allows a special state other than normal data to be stored using a small memory capacity. The time for initialization into the special state (special value) is a constant time, and an extra space for management is also a small capacity.

The array includes a main area including a plurality of elements storing therein data corresponding to indices. Each of the elements includes a plurality of words (an address word and a data word (or data words)) corresponding to the plurality of indices. The "initialization" of the array means that all the elements are initialized into a special state (the following description refers to NULL, an example of the special state (special value)). "Write a valid value" means that an element storing NULL (special value) therein is overwritten with a write value that is an effective value (valid value). "Write a special value" means that no valid data is written to (saved in) an element, in other words, the special value (NULL) is written to the element.

FIG. 35 is a diagram illustrating a data example where, besides valid values that are normal data, NULL, which is a special value, is stored in an array. (1) is a data example to be expressed. In this example, a mixture of normal data (valid values) and NULL (special value) is stored in elements in the main area of the array. The normal data is binary numbers including 0 and 1 and is expressed in hexadecimal in FIG. 35. For example, "FF" represents binary numbers "1111 1111", and "AC" represents binary numbers "1010 1100". However, NULL is a special value different from the normal data and is thus precluded from being mixed with the normal data.

(2) is an example where a flag is utilized to store NULL therein. In this case, in addition to the main area MAIN AREA of the elements of the array, a 1-bit flag area FLAG is provided for each of the elements. A flag "0" indicates normal data (valid value), and a flag "1" indicates NULL (special value), thus allowing NULL to be stored.

(3) is an example where NULL is stored using an escape method. The escape method defines the normal data FF as "FF FF" and NULL as "FF 00". Each of the elements in the main area directly stores 00 to FE without adding "FF" or "00" therein and respectively stores FF and NULL therein as "FF FF" and "FF 00".

The above-described flag method includes the addition, to the array, of the flag area FLAG where the flag bit is stored. The escape method also includes an extra space with the same capacity as that of the main area where normal data is stored to allow "FF FF" or "FF 00" to be stored in each element of the array.

Figure 3:
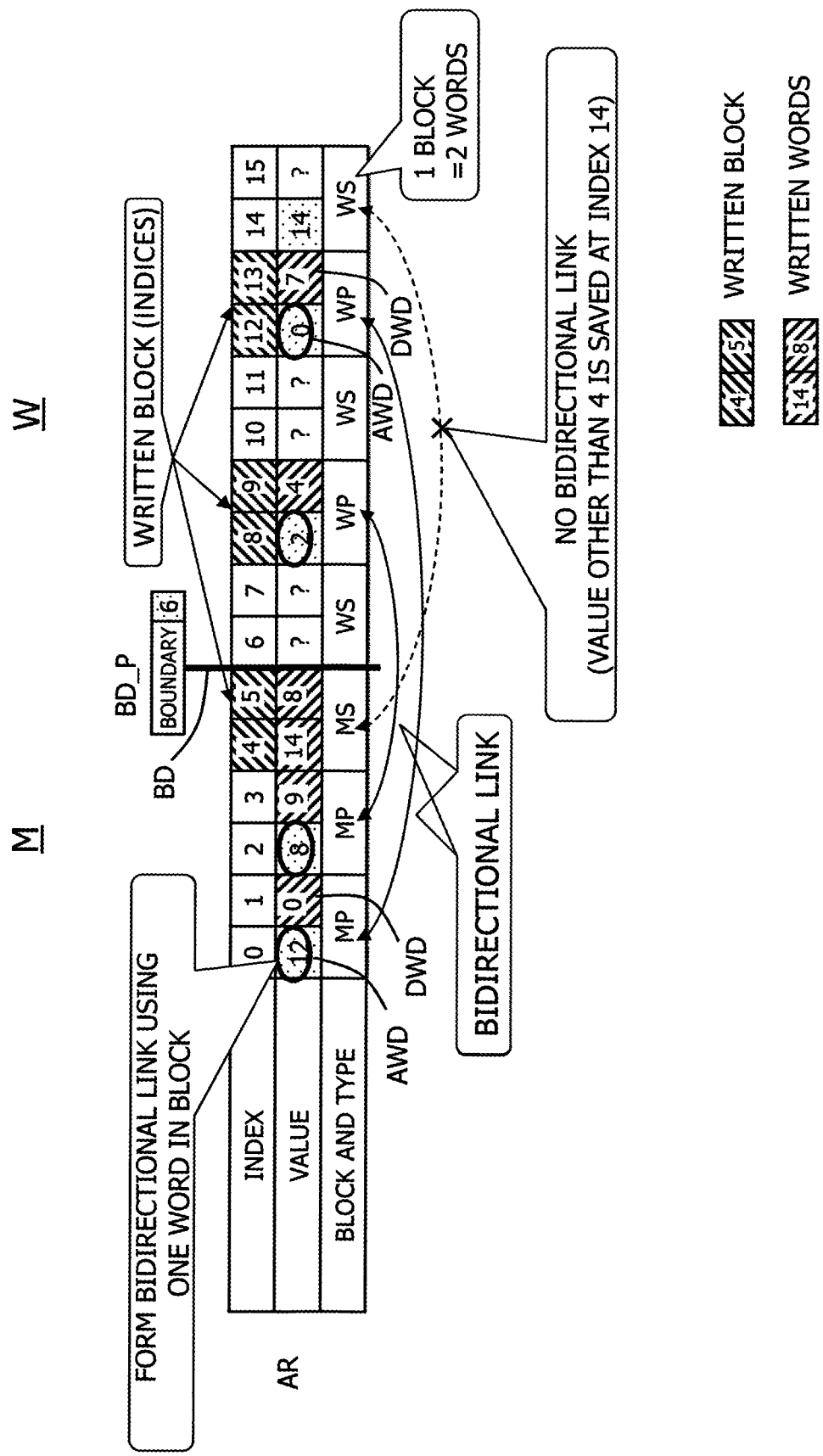
FIG. 3 is a diagram illustrating an optional array in the present embodiment.

FIG. 3 is a diagram illustrating an optional array in the present embodiment. The array involves write and read executed in a constant time independent of an array size and initialization also executed in a constant time. Moreover, no extra space for writing NULL to each element is added to the area of the elements. An extra space for management depends on the array size but has a very small storage size.

An array AR in FIG. 3 includes N(=16/2) elements with an index 0≤i<16 and constitutes a plurality of (in the example in FIG. 3, eight) elements (or blocks) each including a constant number, which is two or more, of (in the example in FIG. 3, two) words (corresponding to each element in the main area) including an address word and a data word.

In the example in FIG. 3, each element (block) includes two words (one element (one block) includes two words). A word in the element (block) that has the minimum index is an address word to which a link destination index of each bidirectional link described below is written. A word with any other index is a data word to which a valid value is written. However, data is also written to the address word. Each element (block) is therefore identified by an even-numbered index. Each word is identified by an index.

The two areas in each element to which values are written are referred to as "words" because the written value is a word with 8 bits, 32 bits, 64 bits, or the like.

A boundary pointer BD_P is also provided as a management area that stores therein a boundary BD indicative of a two-division position for the plurality of blocks of the array. An index "6" to the right of the boundary BD is written to the boundary pointer BD_P.

A first area that is a left one of two areas into which the array is divided at the boundary is referred to as an M area in which the number of unwritten blocks in the M area is stored. A second area that is a right area is referred to as a W area, and the number of written blocks in the W area is stored. A division method is to selectively position a boundary BD such that the number of unwritten blocks in the M area (hereinafter referred to as MPs) is the same as the number of written blocks in the W area (hereinafter referred to as WPs). The boundary is uniquely determined.

The unwritten blocks MP in the M area are associated with the written blocks WP in the W area on a one-to-one basis. The one-to-one association is performed by forming bidirectional links between the blocks MP and WP. In FIG. 3, the bidirectional links are depicted by solid arrows.

Specifically, for an unwritten block MP with indices 0, 1 and a written block WP with indices 12, 13, the index "12" of the written block WP is written to an address word AWD (index 0) of the unwritten block MP. The index "0" of the unwritten block MP is written to an address word AWD (index 12) of the written block WP. Both blocks MP, WP form a bidirectional link accordingly. A block MP with the indices 2, 3 and a block WP with the indices 8, 9 similarly form a bidirectional link. The boundary BD is managed such that the number of unwritten blocks MP in the M area is the same as the number of written blocks WP in the W area, and each bidirectional link is formed between the corresponding blocks MP, WP. The unwritten blocks MP in the M area and the written blocks WP in the W area are thus stored as management information by storing the boundary BD and the bidirectional links. The unwritten blocks MP and the written blocks WP, arranged on the respective sides of the boundary BD, are managed to be the same in number.

Formation of the bidirectional link precludes a value from being written to the address word AWD (index 12) of the written block WP in the W area. A value of the written block WP in the W area is thus written to a data word DWD (index 1) of the unwritten block MP in the M area to which the written block WP in the W area is linked. This will be described below in detail.

On the other hand, the indices of the written blocks MS in the M area are controllably inhibited from being stored in the address words of the blocks in the W area so as to prevent the written blocks MS in the M area from being associated with the unwritten blocks WS in the W area on a one-to-one basis, in other words, so as to preclude formation of the above-described bidirectional links.

Specifically, "14" is written to an address word of a written block MS with indices 4, 5, and thus, a one-directional link is formed for a block with indices 14, 15. The indices "4" of the M area are thus inhibited from being stored in the address word of the block with the indices 14, 15. In the example in FIG. 3, the index "14" of the block with the indices 14, 15 is written to the address word of this block. A block WS with indices 6, 7 and a block WS with indices 10, 11 are unwritten blocks. The values stored in these blocks are not referenced during read (in FIG. 3, this is represented by?), and the special value NULL is read.

For the types of the blocks, blocks with association are referred to as P (Pair) blocks, whereas blocks with no association are referred to as S (Single) blocks. P blocks and S blocks may therefore be present in each of the M area and the W area. The blocks are thus of the following four types.
M Area
MP: unwritten blocks or NULL blocks. A bidirectional link is formed between an MP and a WP.
MS: written blocks. A valid value with m/2 bits is written to each of two words in a block that is an m-bit element, and no bidirectional link is formed between an MS and any of the blocks in the W area.
W Area
WP: written blocks. A bidirectional link is formed between a WP and an MP. A valid value with m/2 bits is written to a data word of a block that is an m-bit element, the data word being one of the two words of the block having an index other than the minimum index, and to a data word of the link destination block MP, the data word being a word of the link destination block having an index other than the minimum index.
WS: unwritten blocks or NULL blocks. No bidirectional link is formed between a WS and any of the blocks in the M area. The array AR has the main area including a plurality of elements that store data therein in association with indices, like th array in FIG. 37. The array AR does not have area for storing the types of blocks, MP, MS, WP and WS. However, the types of blocks can be identified by checking whether the blocks ha the bidirectional link according to the information in the address words or not and whether the blocks are in each M area or W area according to the boundary.

FIG. 4 is a diagram illustrating where the values in the array in FIG. 3 are saved. An array AR in FIG. 4 is the same as the array AR in FIG. 3. First, for the written block MS in the M area, values are saved in the two words of the block. An example is the block MS with the indices 4, 5.

Then, for a written block WP in the W area, a value is saved in the data word DWD of the block WP and a value is also saved in the data word DWD of an unwritten block MP in the M area having a bidirectional link with the block WP. In other words, in order to form a bidirectional link between the unwritten block MP in the M area and the written block WP in the W area, link destination indices are written to the address words AWD. Therefore, the values are saved in the words different from the address words AWD. For example, the value "0" saved at an index 8 of the block WP is saved in the data word DWD of the index 3 of the link destination block MP. The value "0" saved at the index 12 of the block WP is saved in the data word DWD of the index 1 of the link destination block MP. The minimum index of one block is the address word, and the remaining index is the data word DWD. When the number of words in one block is b 2, two words of the 2*b words in a pair of the associated blocks are used as address words, and 2*b−2 words are used as data words.

Finally, the unwritten blocks MP, WS are assumed to store NULL therein, but optional values are saved in the words of the blocks MP, WS. For example, a read value from the block WS with the indices 14, 15 is NULL.

FIG. 4 illustrates a logical array L_AR in which saved indices and values are logically represented in association with an actual array AR in which actually saved values is depicted. The logical array L_AR indicates that values "9" and "0" written to the indices 8, 12 are saved to indices 3, 1, respectively.

The initializable array in FIG. 3 have the following features.

(1) The management information (bidirectional links) that distinguishes between the written areas (blocks WP) and the unwritten areas (blocks MP) is saved in the main area of the array in which no write has been executed yet. The boundary pointer BD_P is the extra space for management. The extra space for management therefore has a size O (log N) that is smaller than the order of magnitude that depends on the array size N.

(2) When the indices of the written areas are stored as the management information that distinguishes between the written areas and unwritten areas in the main area of the array, the number of unwritten areas in the array decreases with progression of the write. This results in the lack of the area in which the management information may be saved. On the other hand, when the unwritten areas are stored as the management information in the main area of the array, the initialization process needs to set all the areas in the array as unwritten areas and thus takes time the amount of which depends on the array size, precluding the write from being completed in the constant time. The storage of the written areas and the storage of the unwritten areas are thus hybridized. That is, the main area of the array is divided into the M area that allows the unwritten areas to be managed and the W area that allows the written areas to be managed. During the initialization, the size of the M area is set to 0, and the size of the W area decreases and the size of the M area increases, with progression of the write. This allows the initialization to be controlled as follows: the initialization is completed in the constant time (the boundary pointer is set to the index 0, and all the elements are set as WS blocks and as NULL), and the number of written areas WP in the W area to be managed is reduced to decrease the amount of management information (the number of bidirectional links) with progression of the write. Furthermore, the management information (boundary BD and bidirectional links) is modified during the write.

(3) The management information is saved in the unwritten areas of the array. However, since a user determines where to write the data and where not to write the data, leading to fragmentation of the unwritten areas are fragmented. The main area of the array is thus managed in units of elements (blocks) each including an address word and a data word. The address words of the pair of blocks are utilized to store a bidirectional link to save the management information. A part of user data is saved in the data word in the block of the bidirectional link destination.

(4) Defining the unwritten blocks MP, WS as NULL enables valid data to be distinguished from NULL. In other words, the management information including the boundary pointer and the bidirectional links enables distinction of elements (blocks) MP, WS storing NULL therein.

[Array Control Program]

Now, control methods for the following processes of the array control program executed by the processor will be described: (1) "initialize(x)": initialization of setting all the elements (blocks) of the array as NULL, (2) "read(i)": read an index i, (3) "write(i, [x1, x2])": write a valid value [x1, x2] to an element (block) with the index i (i is an even number), (4) "write(i, NULL)": write NULL to an element (block) with the index i (i is an even number), (5) "unlink (i)": unlink of a block with the index i that is an auxiliary function to implement a write function, (6) "extend( )": extend the M area by rightward shifting of the boundary BD, and (7) shrink the M area by leftward shifting of the boundary BD.

First, the processor executes the array control program to execute the initialization process described below when the initialization "initialize(x)" is invoked, read and return the value of the index i when the read "read(i)" is invoked, and write the value [x1, x2] to the two words of the element with the index i when the valid-value-write "write(i, [x1, x2])" is invoked. Moreover, the processor sets the element with the index i to a NULL storage state when the NULL write "write (i, NULL)" is invoked.

[Initialization "Initialize(x)"]

Figure 5A:
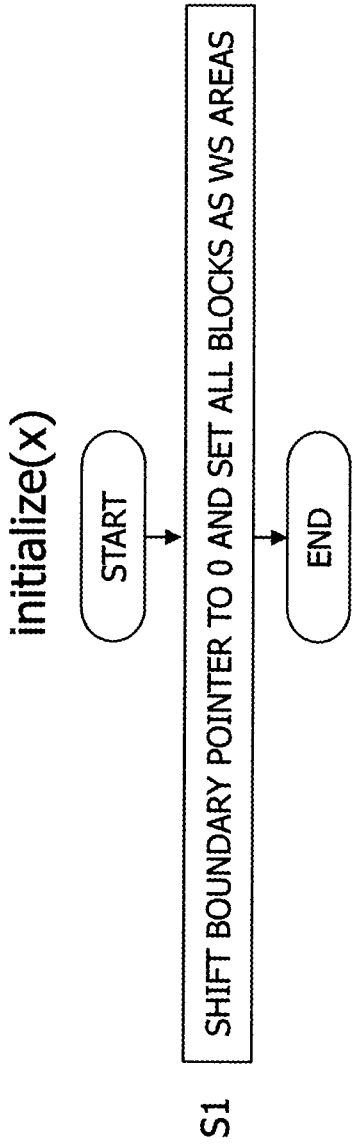
FIG. 5A and FIG. 5B are flowcharts illustrating control for initialization and unlink.

FIG. 5A is a flowchart illustrating control for initialization and unlink. FIG. 6 is a diagram illustrating the initialization process. When the initialization "initialize(x)" is invoked, the processor executing the array control program saves the index 0 at the boundary pointer BD_P to shift the boundary to a left end to initialize the boundary (S1). The index 0 to the right of the boundary is saved at the boundary pointer BD_P. The initialization of the boundary sets all of the main area of the array AR as the W area and eliminates existing bidirectional links. The W area includes only unwritten blocks WS that is the NULL storage state. The unlink in FIG. 5 will be described below.

["read(i)": Read of the Index i]

Figure 7:
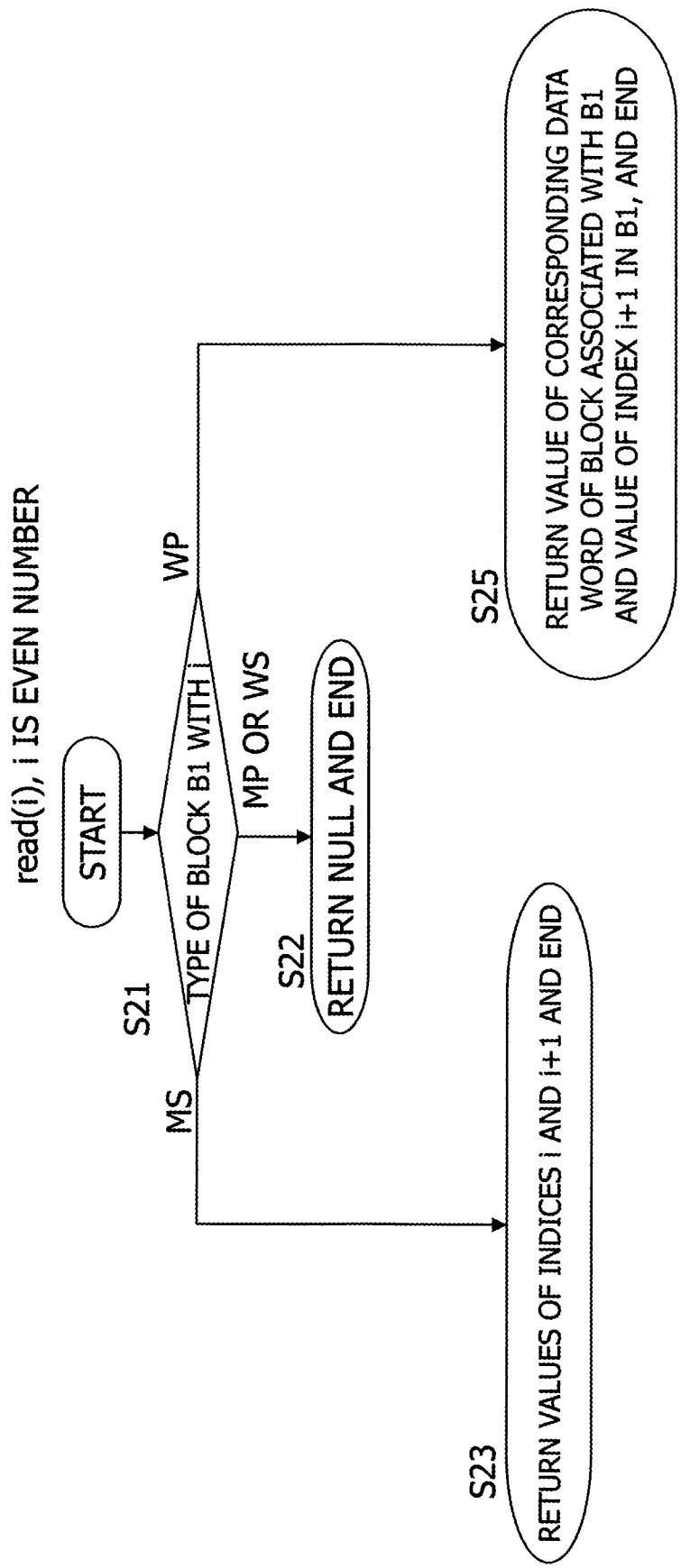
FIG. 7 is a flowchart illustrating control for read.
Figure 8:
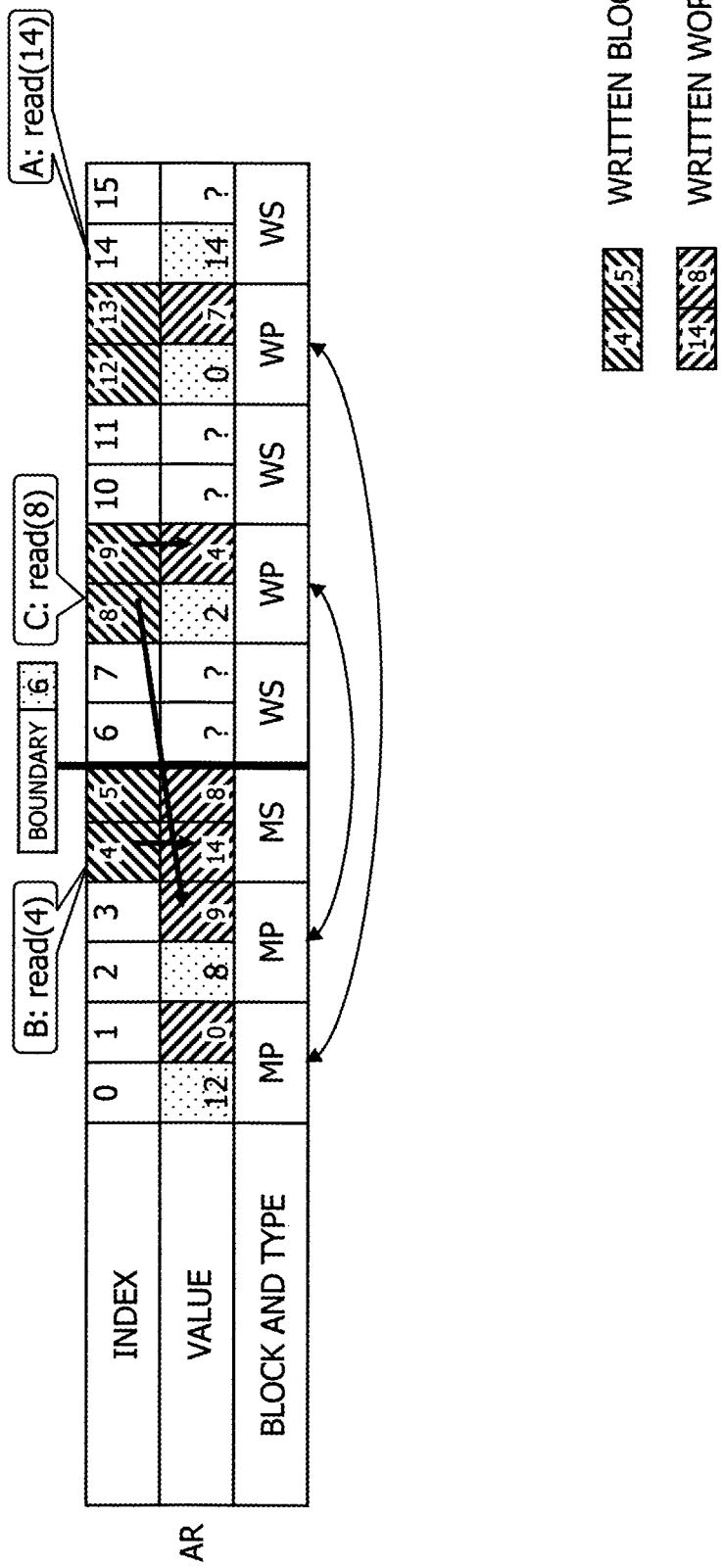
FIG. 8 is a diagram illustrating the read control.

FIG. 7 is a flowchart illustrating control for read. FIG. 8 is a diagram illustrating the read control. In this case, a block with a read destination index i is designated as B1.

When read "read(i)" (i is an even number) is invoked, the processor executing the array control program checks the type of the block B1 with the index i (S21). Determination of the type of the block depends on whether the index i is smaller than the boundary pointer (M area) or equal to or larger than the boundary pointer (W area) and whether or not the block with the index i includes any bidirectional link (MP, WP if the block includes a bidirectional link and otherwise MS, WS). If the type of the block B1 with the index i is an unwritten block MP in the M area or an unwritten block WS in the W area (MP or WS in S21), the processor returns NULL and ends the process (S22). An example is A:read(14) in FIG. 8.

If the type of the block B1 with the index i is a written block MS in the M area (MS in S21), the processor returns the values saved at the indices i and i+1 and ends the process (S23). An example is B:read(4) in FIG. 8.

If the type of the block B1 with the index i is a written block WP in the W area (WP in S21), the processor returns the value of the index i+1 and the value saved in the corresponding data word in the block MP associated (bidirectionally linked) with the block B1, and ends the process (S25). An example is C: read(8) in FIG. 8. In the example in FIG. 8, each block includes one data word, and thus, the processor returns the value of the data word with the index 3 in the block MP with the index 2, and the value of the index 9. If one block has a plurality of data words, a value to be written to the address word of the block with a bidirectional link destination is saved in a predetermined data word of the block with the bidirectional like source.

Then, when valid-value-write "write(i, V)" (i is an even number, and V denotes a valid value or valid data) is invoked, the unlink "unlink(i)" and the extend "extend( )" that shifts the boundary, both of which will be described below, are appropriately invoked. A process of writing the value V to the block with the index i (x1 to the index i and x2 to the index i+1) is executed. The extend "extend" includes two types of "extend" processes E1, E2. The valid-value-write "write" includes four types of write processes W1, W2-1, W2-2, W2-3. Each of the processes involves an unlink "unlink" process of unlinking the blocks in the M area provided with unintended links, to set these blocks as the MS type. In other words, the extend "extend" and the unlink "unlink" are auxiliary functions for the write.

["unlink(i)": Unlink of the Block with the Index i]

Figure 5B:
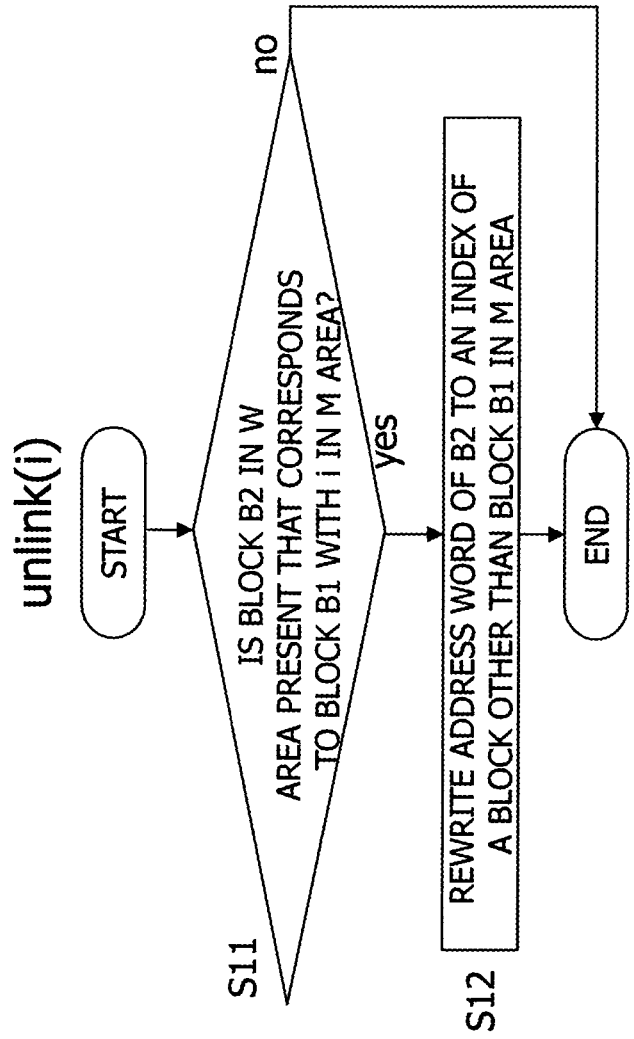
Figure 9:
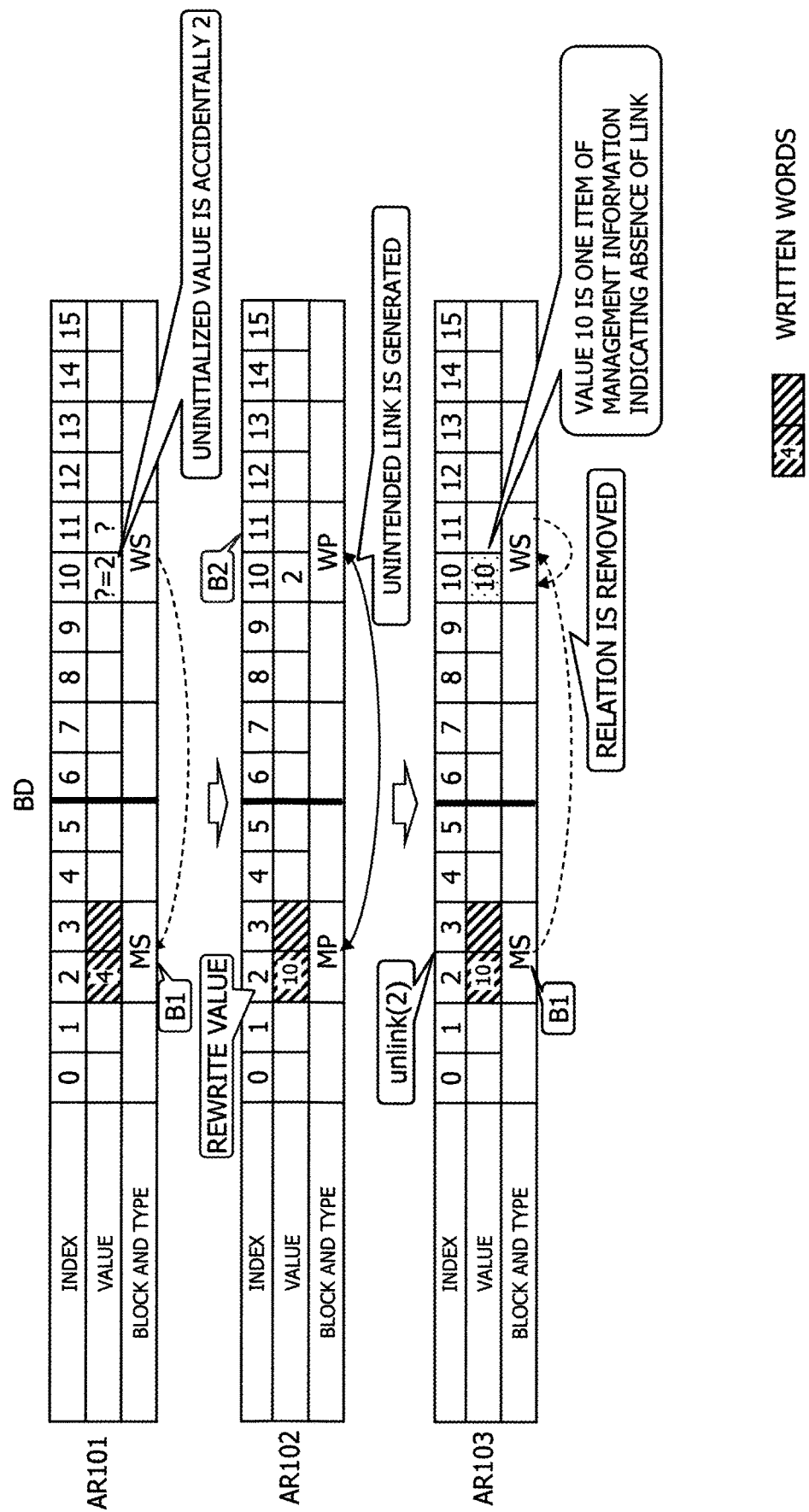
FIG. 9 is a diagram illustrating the unlink control.

FIG. 5B is a flowchart illustrating control for the unlink. FIG. 9 is a diagram illustrating the unlink control. If rewriting of the value for an MS type block results in accidental formation of a bidirectional link with a block in the W area, then the unlink "unlink" is used, for example, to remove the unintended link to maintain the MS type. The unlink is executed by, for example, rewriting the address word of the W area-side block of the accidentally generated bidirectional link, with the own index of this block in the W area.

When the unlink "unlink" is invoked, the processor executing the array control program checks whether a block B2 in the W area is present that has a bidirectional link with the block B1 in the M area that has the index i (S11). If such a block B2 is present, the processor replaces the address word of the block B2 in the W area with the index of a block other than the blocks in the M area (S12). Specifically, for example, the address word of the block B2 in the W area is replaced with the index of the block B2 in the W area.

In a specific example in FIG. 9, the block B1 in the array AR101 is assumed to be a written block MS in the M area, whereas "2" is assumed to be accidentally saved in the address word of the unwritten block WS (B2) in the W area. In the array AR102, when the value "10" is written to the index 2, an unintended bidirectional link is generated between the written block B1 in the M area and the unwritten block B2 in the W area. Thus, the unlink "unlink(2)" is invoked to write the index "10" of the block B2 in the W area to the address word of the block B2 in the W area to remove the unintended link. See AR 103. Any index of the W area may be written to the unlink. However, the index of the block B2 may be written as described above.

["extend( ):" Extend]

The extend "extend" is a process in which, when a valid value is written to an unwritten block MP or WS, an optional value is written to one of the unwritten blocks to generate an optional-value-written MS type block, which is then returned. The valid-value-write "write" process involves executing the write on the optional-value-written block MS or substantially shifting, to the user's write destination, the position of the optional-value-written block MS and executing the write on the shifted optional-value-written block. One block includes two or more words, and the write is executed on the two words. The optional-value-written block MS is therefore acquired, and write values are written to the two words of the acquired optional-value-written block MS (or the write value is written to one of the words of the shifted optional-value-written block).

In other words, when a valid value is written to an unwritten block MP or WS, the number of unwritten blocks MP or WS is reduced by one, while the number of written blocks MS or WP is increased by one naturally. The extend "extend" process is thus executed for keeping the number of blocks MS in the M area equal to the number of blocks WP in the W area.

Since the write value (valid value) is written to the optional-value-written block MS resulting from the extend as described above, the optional-value write process S32, S36 in FIG. 10 may be omitted from the extend process described below. In other words, since the extend process uses an optional value, even with the optional-value write process S32, S36 omitted, the block MS is still an optional-value-written block.

Figure 10:
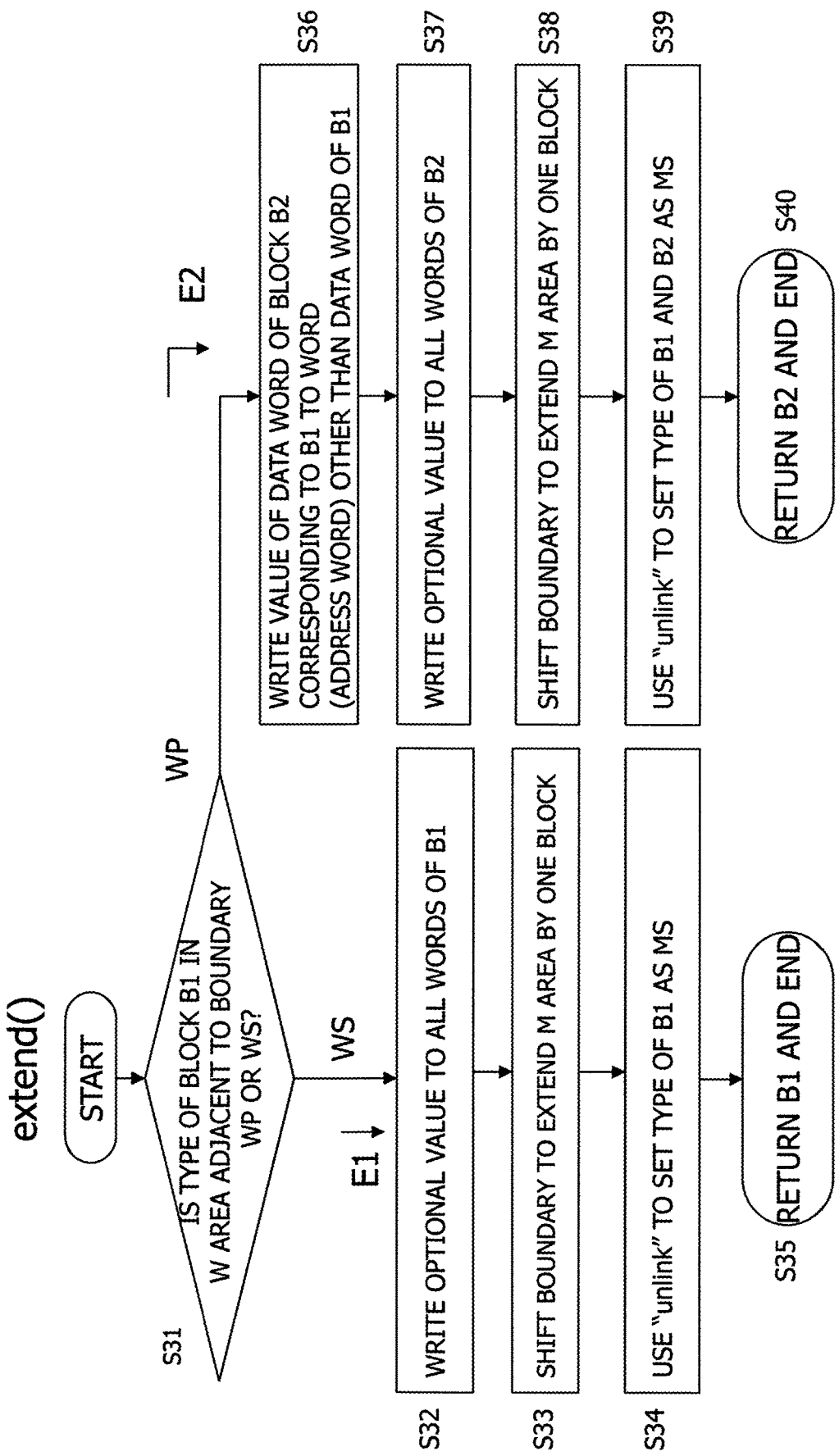
FIG. 10 is a flowchart of control of the extend "extend( )".
Figure 11:
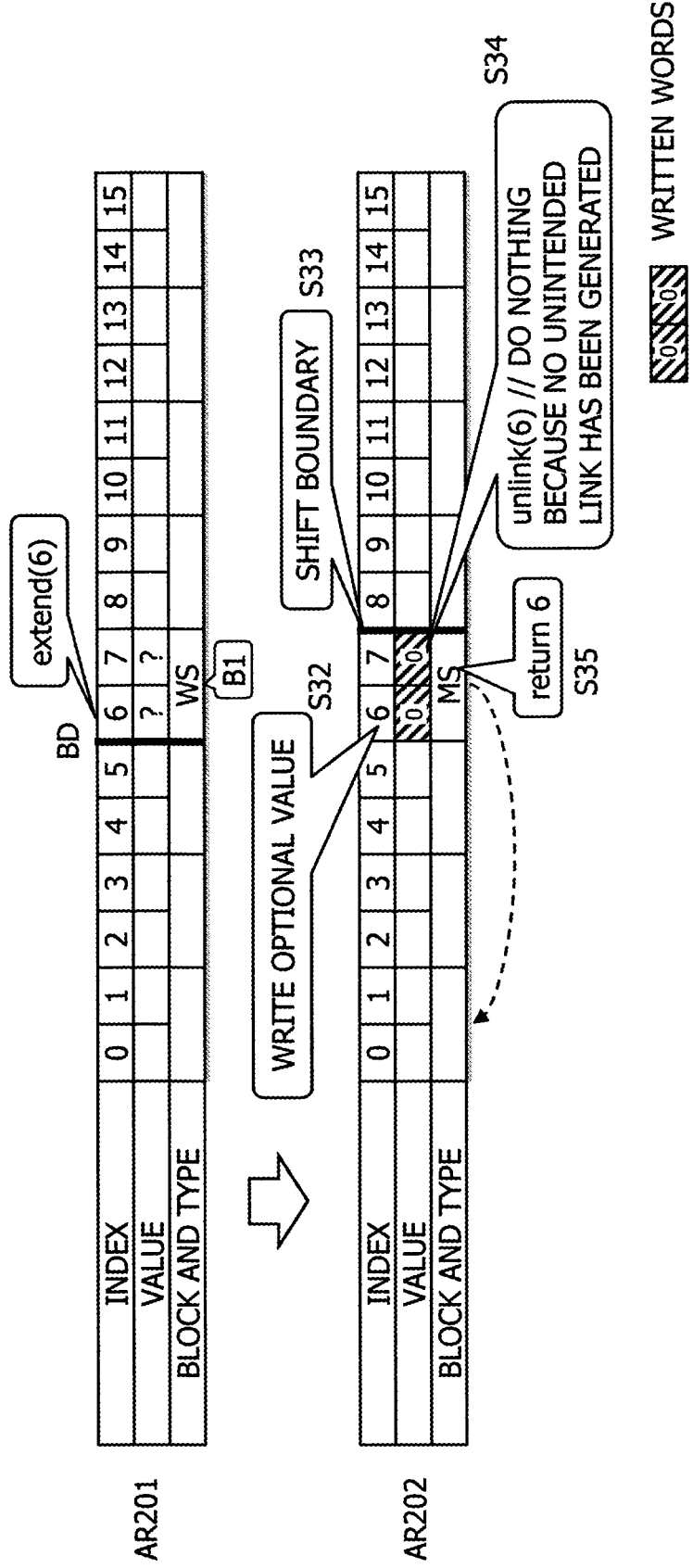
FIG. 11 is a diagram of extend control E1 performed when the block B1 in the W area that is adjacent to the boundary is of the WS type.
Figure 12:
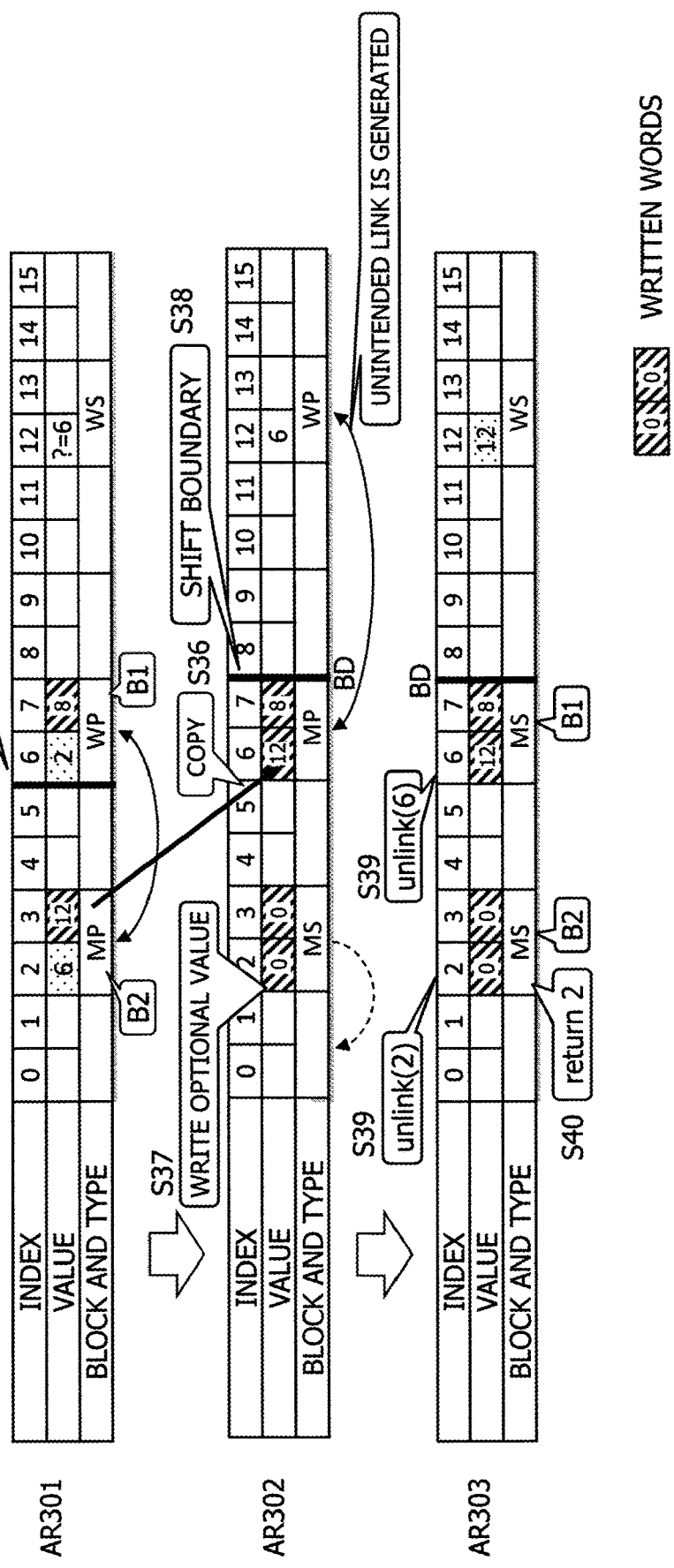
FIG. 12 is a diagram of extend control E2 performed when the block B1 in the W area that is adjacent to the boundary is of the WP type.

FIG. 10 is a flowchart of control of the extend "extend( )". FIG. 11 is a diagram of extend control E1 performed when the block B1 in the W area that is adjacent to the boundary is of the WS type. FIG. 12 is a diagram of extend control E2 performed when the block B1 in the W area that is adjacent to the boundary is of the WP type.

As illustrated in the flowchart in FIG. 10, when the extend "extend( )" is invoked, the processor executing the array control program determines the type of the block B1 in the W area that is adjacent to the boundary (the block with the index of the boundary pointer) (S31).

(E1) As illustrated in FIG. 11, if the block B1 in the W area adjacent to the boundary is of the WS type (WS in S31), the processor writes an optional value to all words of the unwritten block WS (B1) (S32), shifts the boundary to extend the M area by one block (S33), and executes the unlink "unlink" process as desired to set the type of the block B1 to MS (B1) (S34). The optional-value-written block MS (B1) is returned as an empty block MS to which a value is to be written (S35). In other words, this process directly changes the block WS (B1) in the W area adjacent to the boundary, to the optional-value-written block MS, to remove the one block WS (B1) in the W area adjacent to the boundary while adding the one block MS (B1). This prevents a fluctuation in the numbers of MPs and WPs and keeps the numbers of MPs and WPs equal to each other.

(E2) On the other hand, as illustrated in FIG. 12, if the block B1 in the W area adjacent to the boundary is of the WP type (WP in S31), the processor writes (copies) the data "12" written to the data word of the link destination block MP (B2) of the block WP (B1) to the address word (i=3) of the written block WP (B1) (S36), and writes an optional value to all the words (i=6) of the link destination block MP (B2) (S37) (this write may be omitted). The processor then shifts the boundary to extend the M area by one block (S38) and executes the "unlink" process as desired (S39) to set, as optional-value-written blocks MS (B1), value-written-block MS (B2), the block WP (B1) in the W area adjacent to the boundary and the link destination block MP (B2) of the block WP (B1). The optional-value-written block MS (B2) is then returned (S40). In other words, since the extend removes one WP (B1), this process removes one MP (B2) while adding one MS (B2) to keep the numbers of MPs and WPs equal to each other. However, the MP (B2), which is the link destination of the block WP (B1) in the W area adjacent to the boundary, is precluded from being changed to an optional-value-written block MS. Thus, the data "12" of the MP (B2), which is the link destination of the boundary right block WP (B1), is written to the boundary right block WP (B1), which thus changes to an MS (B1). An optional value is written to the link destination MP (B2) to generate an optional-value-written block MS (B2). This keeps the number of MPs in the M area equal to the number of WPs in the W area for number juggling.

As described above, the meaning of the extend "extend" process is as follows. For example, when the write is executed on an unwritten block MP to change the unwritten block MP to a written block MS, the number of the MPs in the M area decreases. On the other hand, when the write is executed on an unwritten block WS to change the unwritten block WS to a written block WP, the number of the WPs in the W area increases. Thus, for the management target blocks MP and WP in the M and W areas, the number of MPs decreases or the number of WPs increases. As a result, to maintain the condition that the numbers of the MPs and the WPs are kept the same, the boundary needs to be shifted rightward, an MP needs to be added to deal with the reduced number of MPs, and an MP also needs to be added to deal with the increased number of WPs.

To achieve the number juggling, the extend "extend" process is executed. As described above, the extend "extend" process shifts the boundary rightward to generate an optional-value-written block MS. The write "write" process described below is executed to write a write value directly to the optional-value-written block MS or to change the position of the optional-value-written block MS and write the write value to the changed block.

["write(i, V)": Write the Valid Value V to the Element with the Index i, where i Denotes an Even Number and V=[x1, x2]]

Figure 13:
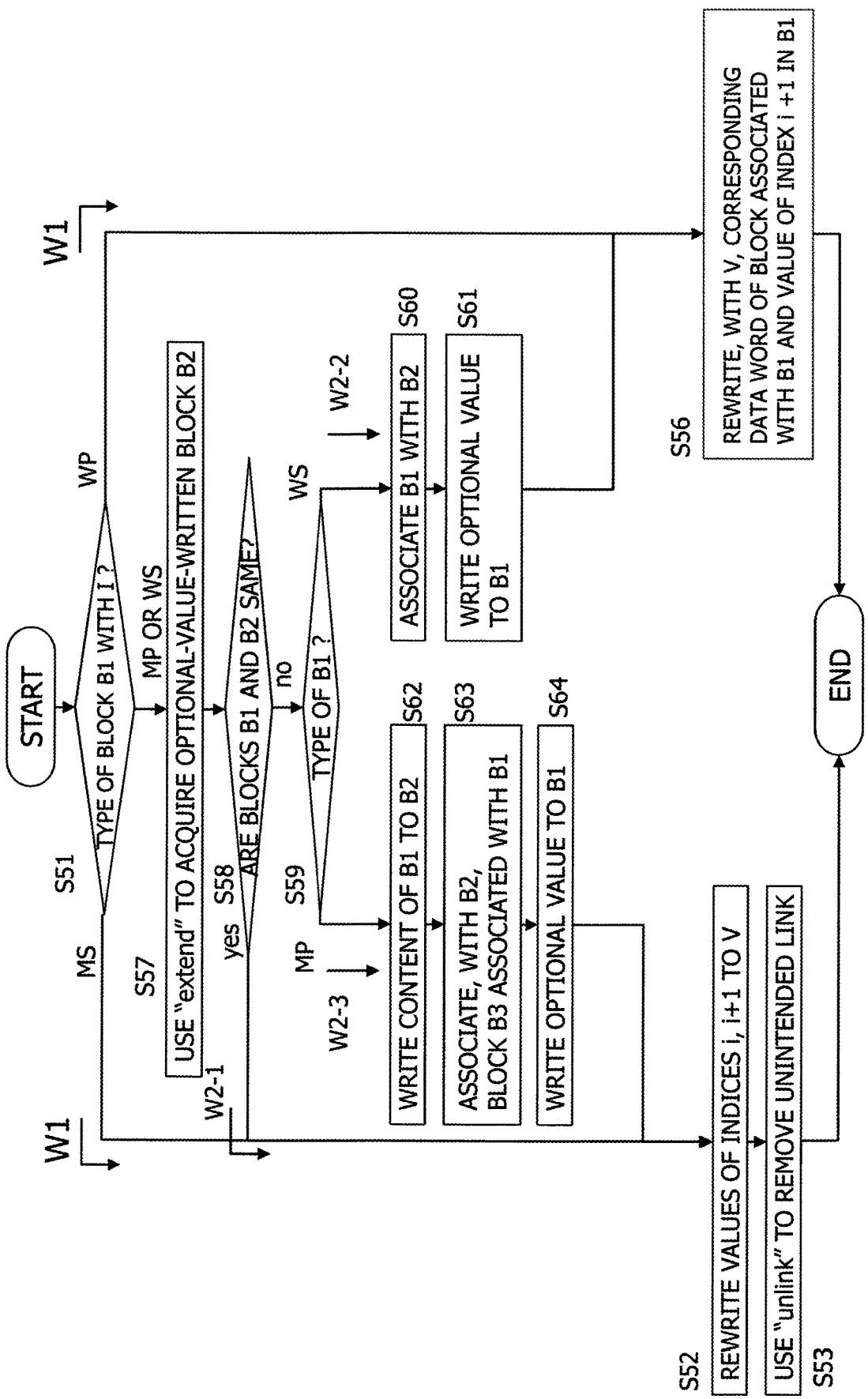
FIG. 13 is a flowchart illustrating control for valid-value write "write(i, V)"
Figure 14:
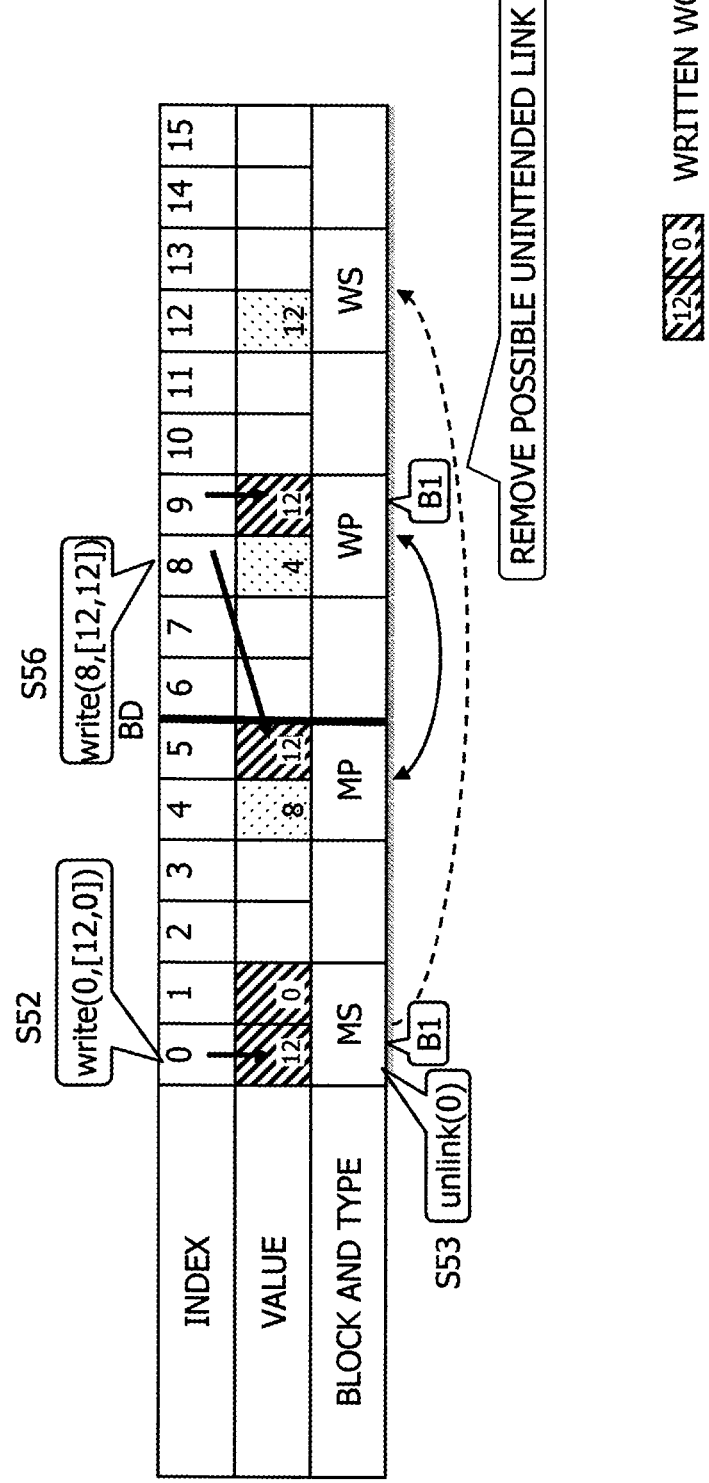
FIG. 14 is a diagram illustrating a valid-value write process W1.
Figure 15:
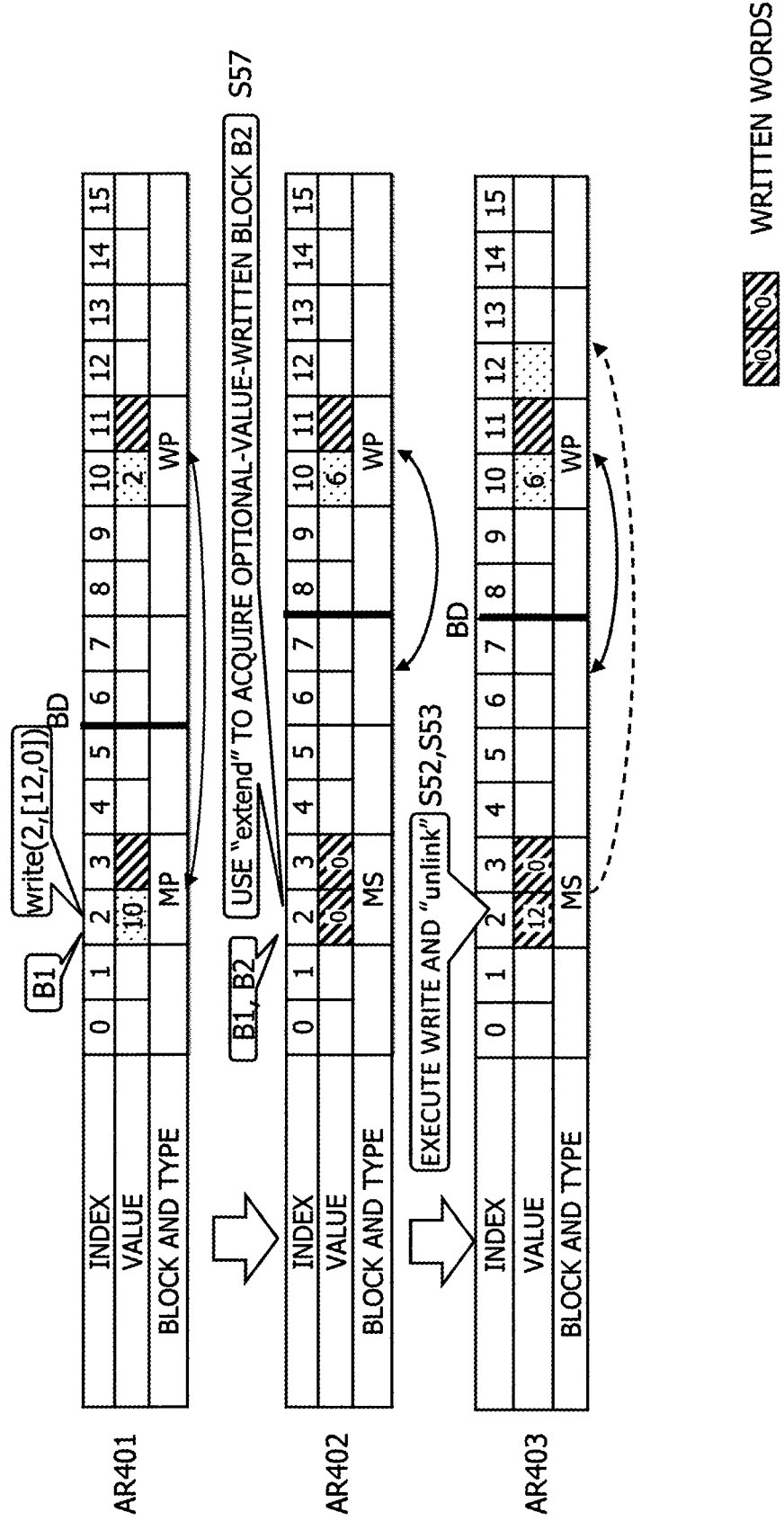
FIG. 15 is a diagram respectively illustrating valid-value write processes W2-1, W2-2, and W2-3.
Figure 16:
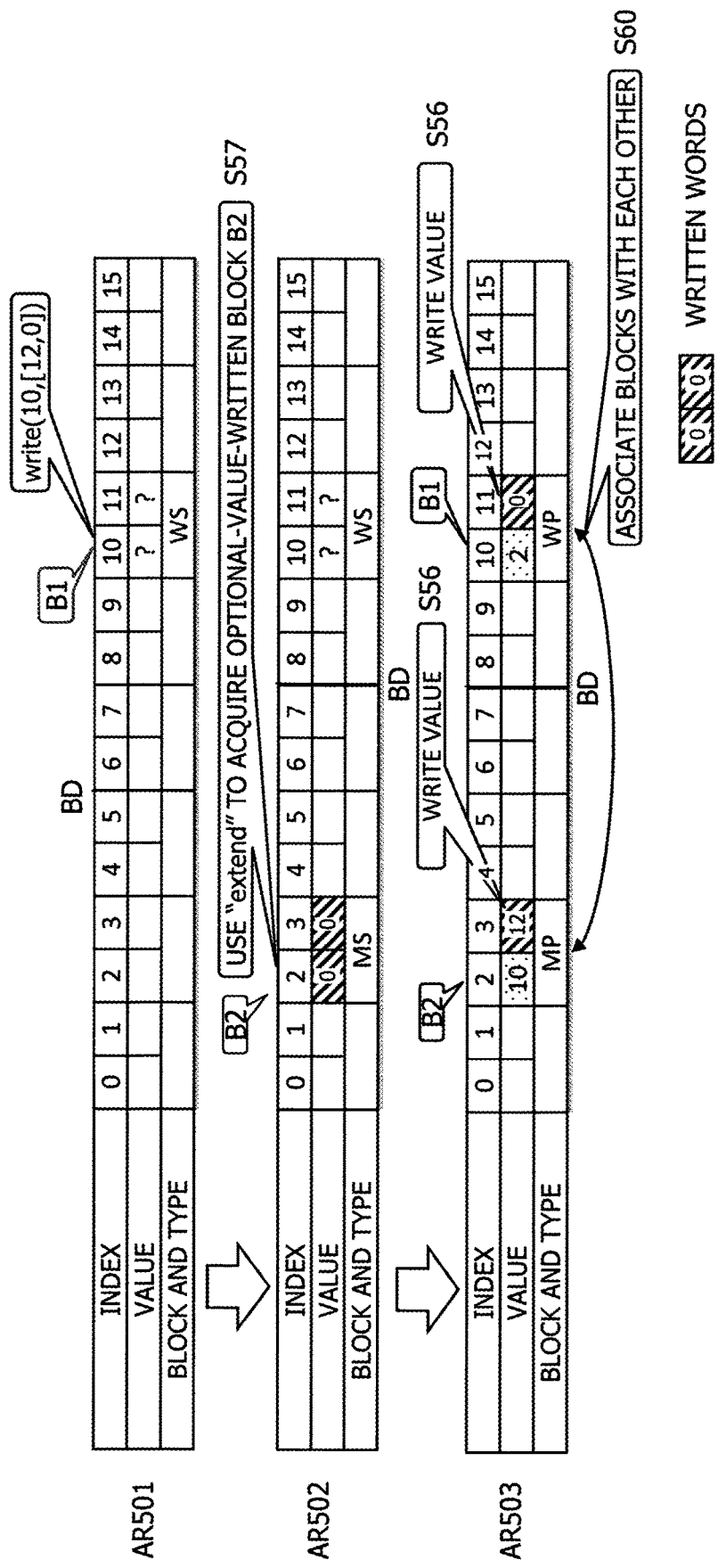
FIG. 16 is a diagram respectively illustrating valid-value write processes W2-1, W2-2, and W2-3.
Figure 17:
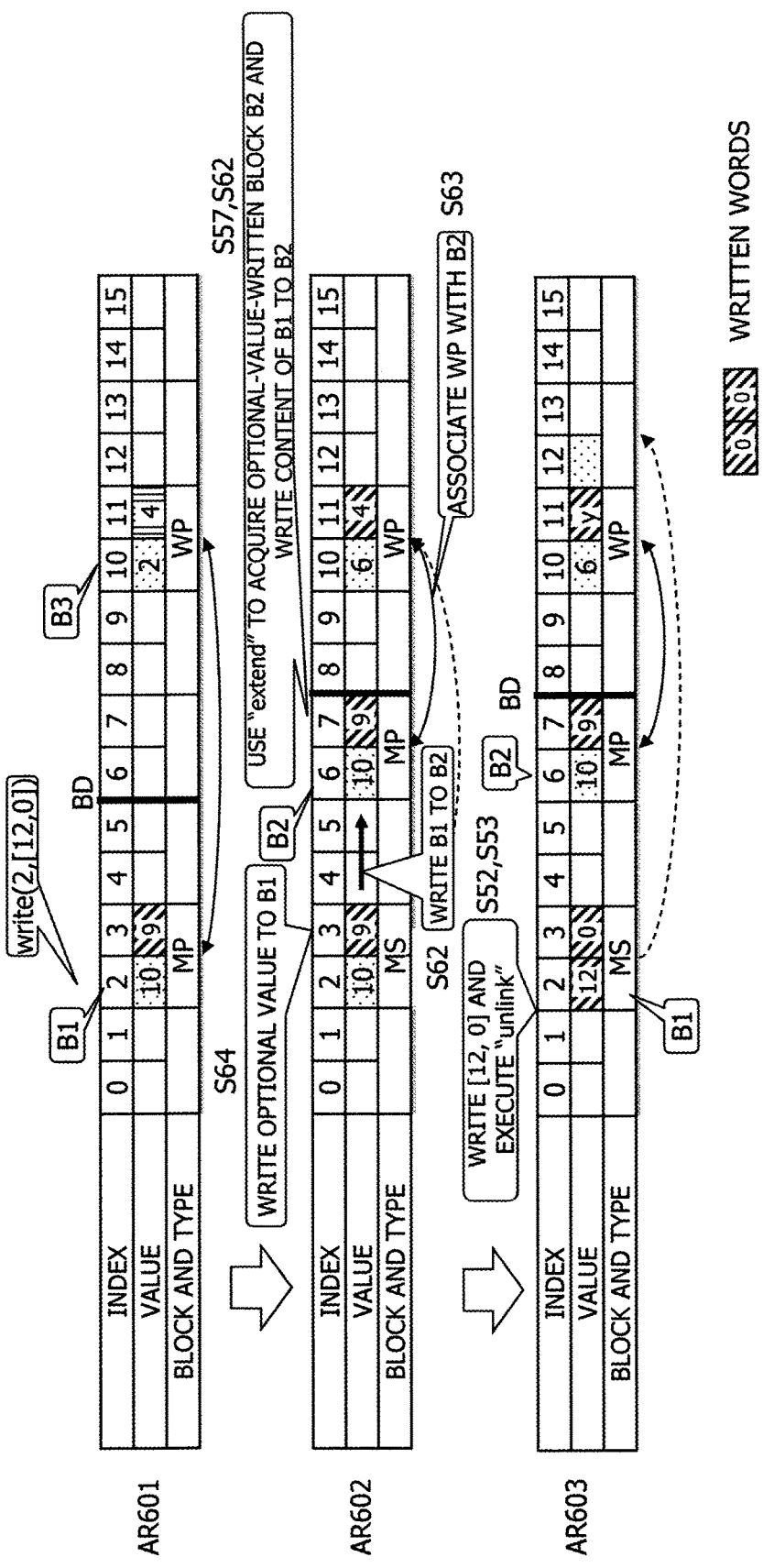
FIG. 17 is a diagram respectively illustrating valid-value write processes W2-1, W2-2, and W2-3.

FIG. 13 is a flowchart illustrating control for valid-value write "write(i, V)". FIG. 14 is a diagram illustrating a valid-value write process W1. FIG. 15, FIG. 16, and FIG. 17 are diagrams respectively illustrating valid-value write processes W2-1, W2-2, and W2-3. In this case, a block with a write destination index is denoted as B1, a block that is acquired by the extend "extend" is denoted as B2, and a block associated with the write destination block B1 is denoted as B3. The above B1 and B2 are different from B1 and B2 in FIG. 10.

When the valid-value write "write(i, V)" is invoked, the processor, executing the array control program, determines the type of the block B1 with the write destination index i (S51).

(W1) As illustrated in FIG. 14, if the block B1 with the write destination index i is of the written block MS or WP type (MS or WP in S51), the write destination is identified using the same method as that for the read "read" process, and a write value x is written to the write destination. For example, if the block B1 with the index i is an MS, the write value V=[x1, x2] is written to the words with the indices i, i+1 in the block B1 (MS) with the index i (S52) and the unintended link is removed using the unlink "unlink" (S53). If the block B1 with the index i is a WP, the value x1 is written to the data word of the link destination block MP of the write destination block WP (B1), and the value x2 is written to the index i+1 (S56). FIG. 14 illustrates that write(0, [12,0]) is written in step S52 and that write(8, [12,12]) is written in step S56.

(W2) If the write destination block B1 with the index i is of the unwritten block MP or WS type (MP or WS in S51), the extend "extend" process is executed to acquire an optional-value-written block B2 (MS) (S57) is B1 and B2 in FIG. 10.

(W2-1) As illustrated in FIG. 15, if the write destination block B1 is the same as the optional-value-written block B2 acquired by the extend process (YES in S58), since the write destination block B1 is an optional-value-written block MS (B1), the following is executed as in a case where the write destination is an MS (W1): the value V=[x1, x2] is written to the indices i, i+1 (S52), and a desired unlink process is executed to remove the unintended link, thus maintaining the MS (B1) (S53). FIG. 15 illustrates a case of write(2, [12,0]) where the write destination block B1 (MP) is changed to an MS (B1) by the "extend", and instead, a block with an index 6 is changed to the link destination of the link destination block WP that was the link destination of the B1. See AR401, 402. The value [12, 0] is written to the indices 2, 3 of the write destination block MS (B1) that is changed to an MS, and the link is removed by "unlink(2)". See AR403.

In other words, the write W2-1 results in a match between the write destination block B1 and the optional-value-written block B2 (MS) resulting from the "extend" process, and thus, the value ([12,0]) is written to the write destination indices i, i+1.

(W2-2) As illustrated in FIG. 16, if the write destination block B1 and the optional-value-written block B2 are different from each other (NO in S58) and the B1 is of the WS type (WS in S59), see AR501, a bidirectional link is generated between the write destination block B1 (WS) and the optional-value-written block B2 (MS) resulting from the "extend" to associate the blocks B1 and B2 with each other (S60). See AR502, 503. An optional value is written to the write destination block B1 (a WP to which the WS has been changed by the link generated) (S61). The write value V=[12,0] is then written to indices 3, 11 as in a case where the write destination block B1 (WP) is a WP (S56).

In other words, the write destination block B1 (WS) needs to be changed from WS to optional-value-written block WP (B1) before the write is executed, and thus, the optional-value-written block B2 (MS) resulting from the "extend" is changed to the link destination block MP (B2) of the optional-value-written block WP (B1). This change substantially means that the position of the optional-value-written block B2 (MS) resulting from the "extend" process has been shifted to the write destination block B1 (WP).

(W2-3) As illustrated in FIG. 17, if the write destination block B1 and the optional-value-written block B2 are different from each other (NO in S58) and the B1 is of the MP type (MP in S59), see AR601, the value of the data word of the write destination block B1 (MP) is written to the optional-value-written block B2 (MS) resulting from the "extend" (S62). See AR602. A link is then formed between the link destination block B3 (WP) of the write destination block B1 (MP) and the optional-value-written block B2 (WP) (S63). See AR602. As a result, the optional-value-written block B2 (MS) changes from MS to MP. An optional value is then written to the write destination block B1 (S64), which is thus set as an optional-value-written block B1 (MS). The block B2 (MS) resulting from the "extend" process consequently substantially shifts to the write destination block B1 (MS). The value is then written as in a case where the write destination block B1 (MS) is an MS (S52, S53). That is, the write value V=[12,0] is written to the write destination block B1 (MS) (S52), and the unintended link is removed by the "unlink" process (S53). See AR603.

In other words, the write destination block B1 needs to be changed from MP to optional-value-written block MS before the write is executed, and thus, the optional-value-written block B2 (MS) acquired by the "extend" is changed to the link destination MP of the block B3 (WP) instead of the write destination block B1 (MP). The block B2 (MS) acquired by the "extend" is consequently substantially changed to the link destination of the B3 (WP), which has been the link destination of the write destination block B1 (MS). The write destination block B1 is changed to an optional-value-written block MS, with the value written to the B1 (MS).

["write(i, NULL)": Write of NULL to the Element with the Index i]

Figure 18:
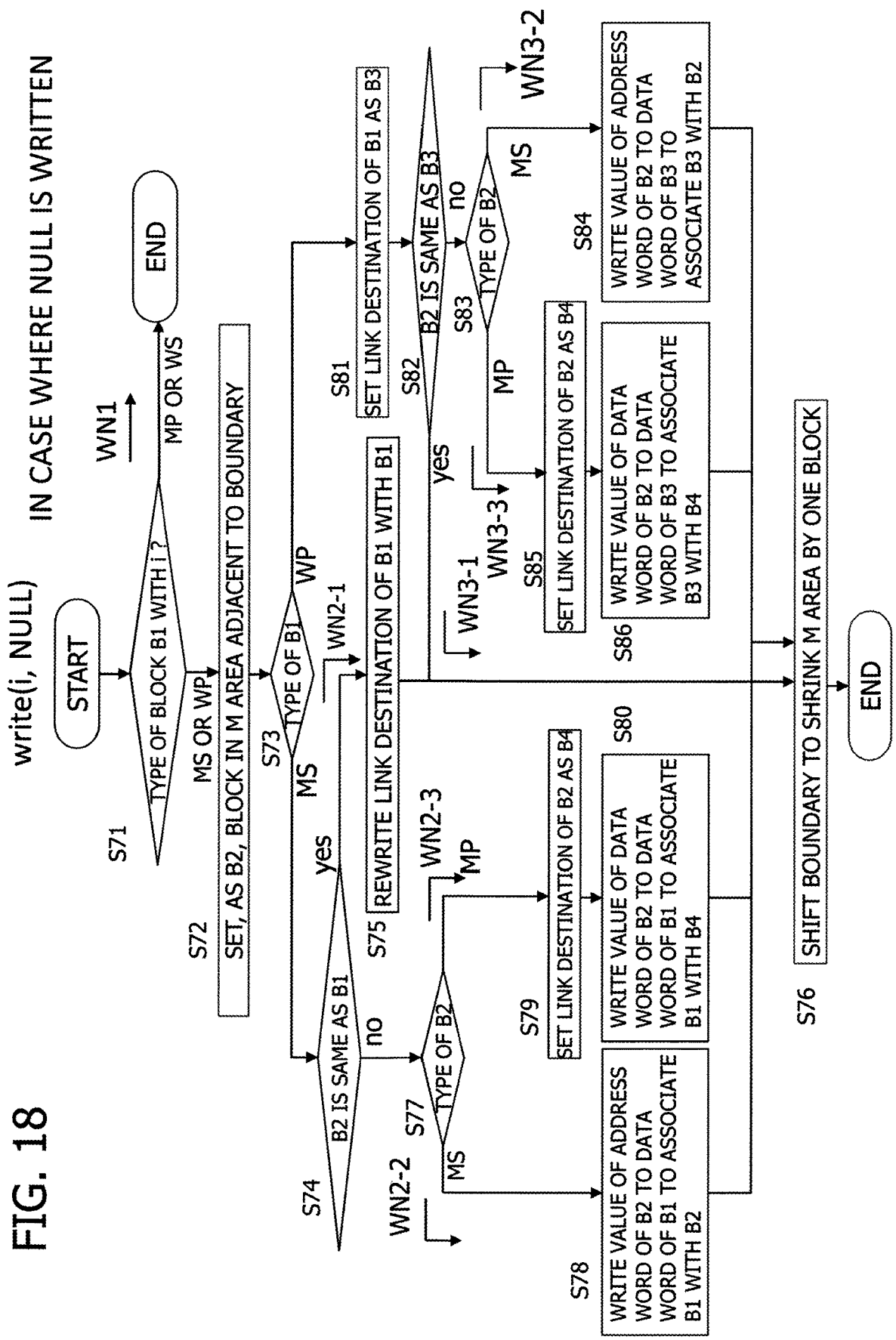
FIG. 18 is a flowchart illustrating control for NULL write "write(i, NULL)".
Figure 20:
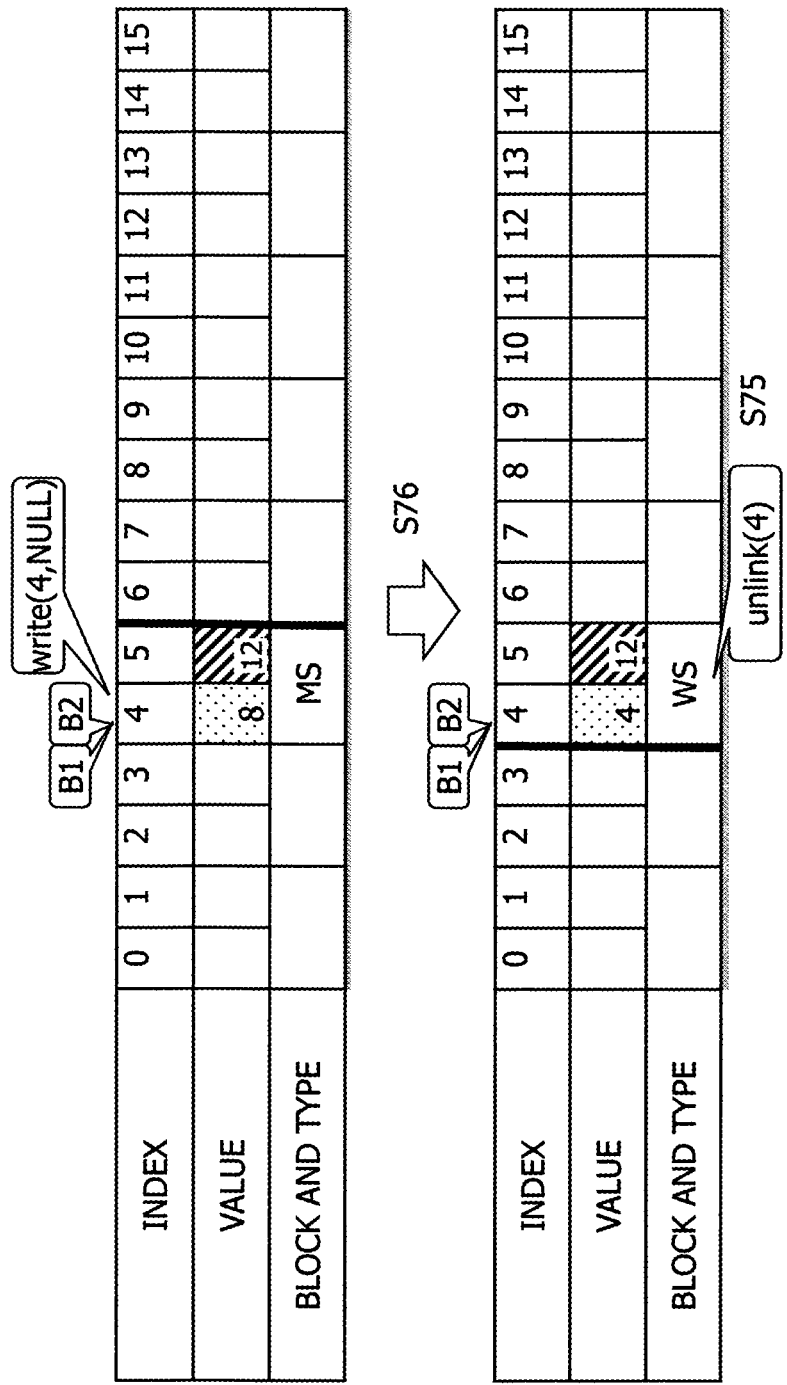
FIG. 20 respectively illustrates NULL write processes WN2-1.
Figure 21:
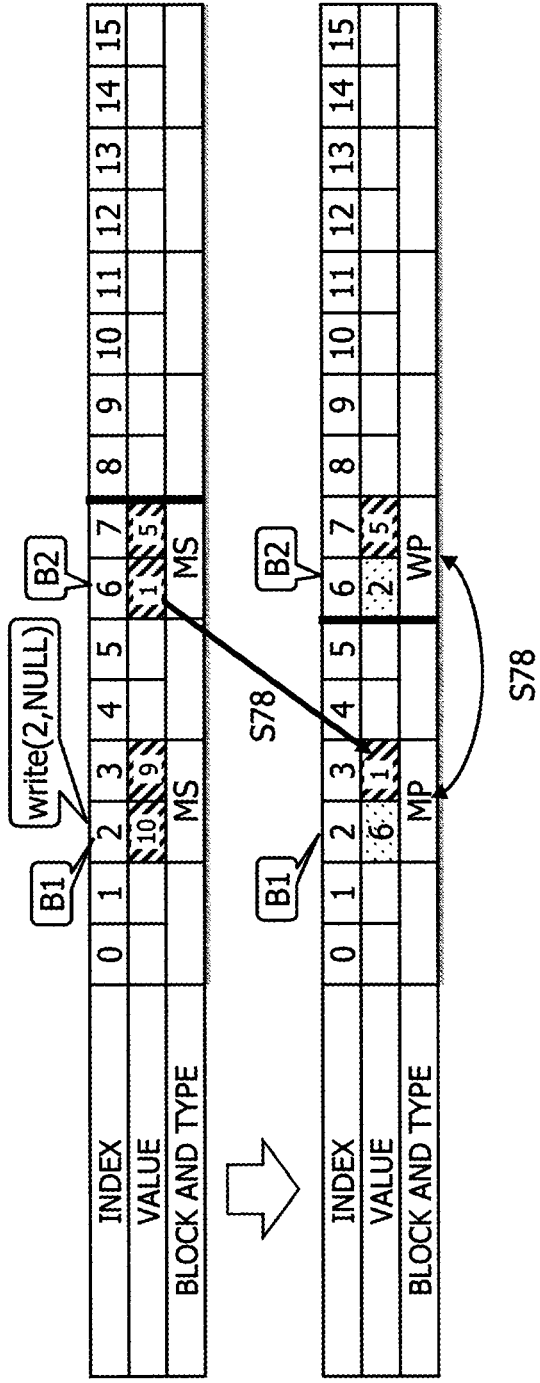
FIG. 21 respectively illustrates NULL write processes WN2-2.
Figure 22:
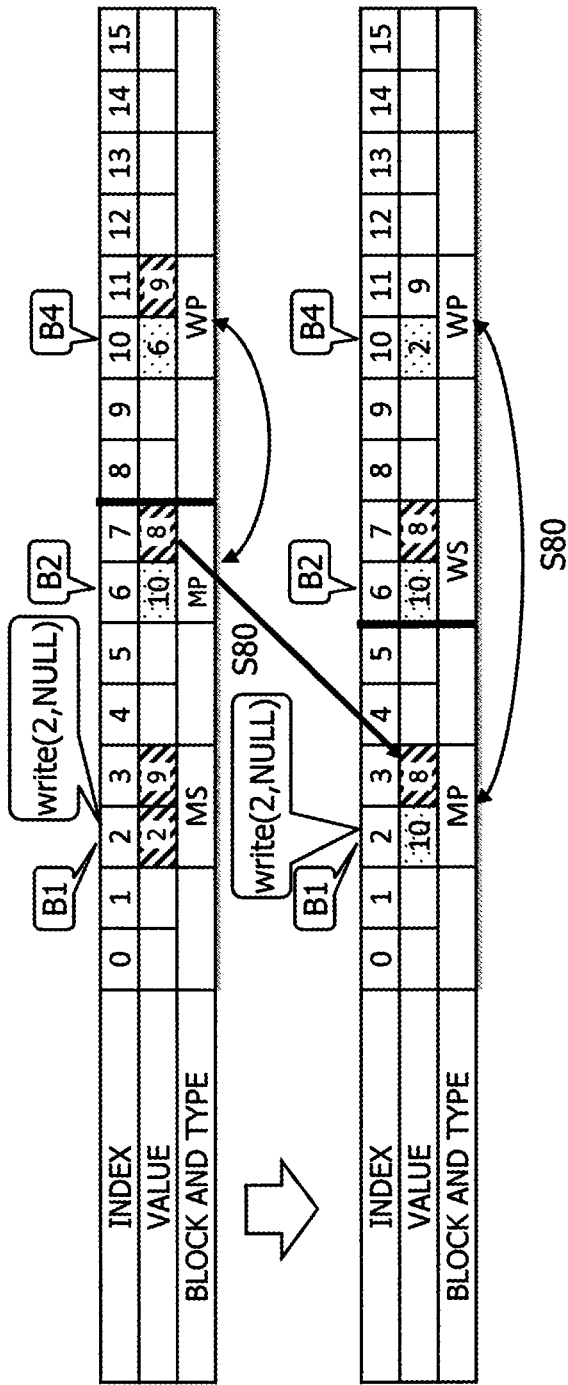
FIG. 22 respectively illustrates NULL write processes WN2-3.
Figure 23:
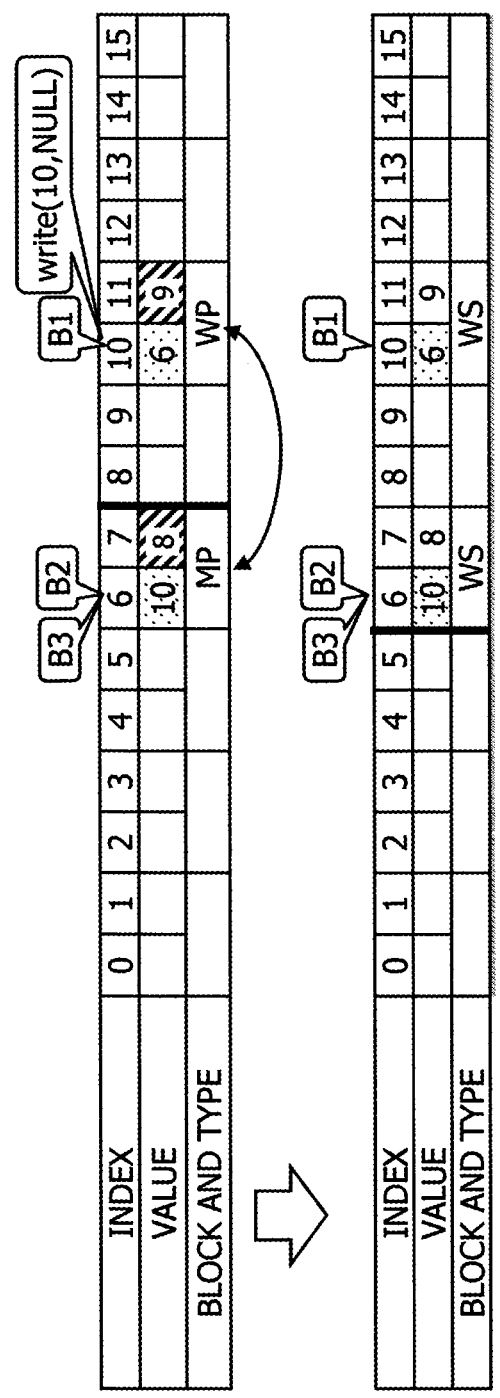
FIG. 23 respectively illustrates NULL write processes WN3-1.
Figure 24:
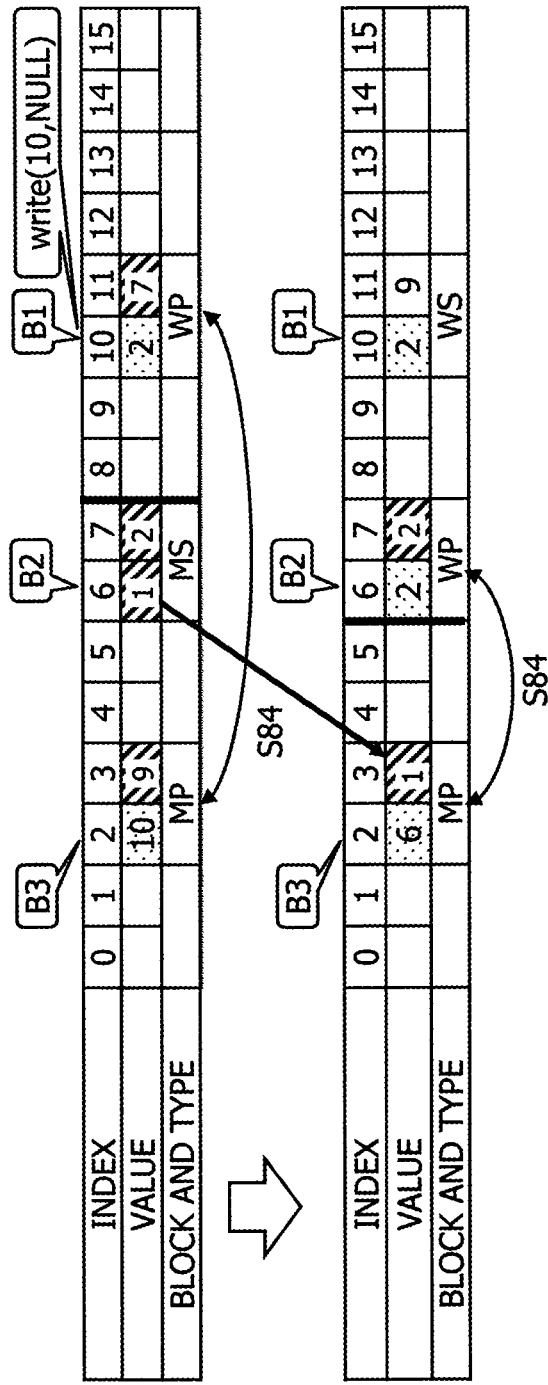
FIG. 24 respectively illustrates NULL write processes WN3-2.

FIG. 18 is a flowchart illustrating control for NULL write "write(i, NULL)". FIG. 19 is a diagram illustrating a NULL write process WN1. FIGS. 20, 21, and 22 respectively illustrate NULL write processes WN2-1, WN2-2, WN2-3. FIGS. 23, 24, and 25 respectively illustrate NULL write processes WN3-1, WN3-2, WN3-3.

In this case, the block with the write destination index is denoted as B1, and the block in the M area adjacent to the boundary (hereinafter referred to as the boundary M-side adjacent block) is denoted as B2. The link destination of the B1 is denoted as B3, and the link destination of the B2 is denoted as B4. The B1-B3 are different from B1-B2 in FIG. 10 and B1-B3 in FIGS. 14-17.

In the NULL write, when the write destination block is an unwritten block MP or WS, no process is needed in particular because NULL (optional-value) has already been stored in the write destination block.

On the other hand, if the write destination block is a written block MS or WP, the write process includes a shrink process for shifting the boundary toward the M area side by one block and increasing the size of the W area by one block, and a process for changing the write destination block from MS to MP or from WP to WS.

In that case, if the write destination block is an MS, the write process includes a generation process for a new link for changing the write destination block MS to an MP in the NULL stored state. On the other hand, if the write destination block is a WP, the write process includes a deletion process for deleting a link with the MP associated with the write destination block WP, in order to change the write destination block WP to a WS in the NULL stored state.

Moreover, if the boundary M-side adjacent block is an MP, the write process includes, in association with the shrink process, a process for an existing link with the MP associated with the write destination block WP.

The NULL write includes six types of processes. That is, if the write destination block is an MS, the NULL write includes a process WN2-1 for a case where the B2 is the same as the B1 and processes WN2-2, WN2-3 for two cases where the B2 is different from the B1 and where the boundary M-side adjacent block B2 is one of an MS and an MP. If the write destination block is a WP, the NULL write includes a process WN3-1 for a case where the B2 is the same as the B3 and processes WN3-2, WN3-3 for two cases where the B2 is different from the B3 and where the boundary M-side adjacent block the B2 is one of an MS and an MP.

As illustrated in FIG. 18, when the NULL write "write(i, NULL)" is invoked, the processor, executing the array control program, determines the type of the block B1 with the write destination index i (S71).

(WN1) As illustrated in FIG. 19, if the write destination block B1 with the index i is of the unwritten block MP or WS type (MP or WS in S71), the processor does nothing. That is, the write destination block B1 (MP) or the B1 (WS) is in the unwritten state and is thus already in the NULL state. The processor therefore executes no write process.

(WN2) As illustrated in FIG. 18, if the write destination block B1 is of the written block MS or WP type (MS or WP in S71), the processor sets the block in the M area adjacent to the boundary as B2 (S72). If the write destination block B1 is of the MS type (MS in S73), the processor executes the following NULL write WN2-1 to WN2-3.

(WN2-1) FIG. 20 is a diagram illustrating the NULL write process WN2-1. As illustrated in FIG. 18, if the block B2 is the same as the block B1 (YES in S74), the processor rewrites the value of the address word of the write destination block B1 with the index (an index "4" in FIG. 20) of the write destination block B1 to remove the unintended link (S75). The processor shifts the boundary to shrink the M area by one block (S76). The process for shifting the boundary shrinks the M area and is thus referred to as the shrink process. The two processes S75, S76 may be in the reversed order. As a result, the write destination block B1 is set as an unwritten block WS and is thus brought into a NULL written state.

As described above, the NULL write includes the process for shifting the boundary toward the M area side to shrink the M area (S76) and the process for setting the write destination block B1 to the unwritten state MP or WS (NULL state block) (S75). In other words, the latter process is a process for setting the write destination block B1 as an MP if the block B1 is finally included in the M area and setting the write destination block B1 as a WS if the block B1 is finally included in the W area. This also applied to the following NULL write.

(WN2-2) FIG. 21 is a diagram illustrating the NULL write process WN2-2. As illustrated in FIG. 18, the NULL write process WN2-2 is used for a case where the write destination block B1 is a written block MS (MS in S73), a case where the boundary M-side adjacent block B2 is different from the write destination block B1 (NO in S74), and a case where the boundary M-side adjacent block B2 is an MS (MS in S77). This process includes setting the write destination block B1 (MS) as an unwritten block B1 (MP), and thus, providing, in the W area, a link destination block WP for the write destination block B1 (MP) (NULL state block).

The processor thus shifts the boundary to shrink the M area by one block (S76: shrink process). To set the boundary M-side adjacent block B2 (MS) as the link destination of the write destination block B1 (MS), the processor further writes (shifts) the value "1" of the address word of the block B2 (MS) to the data word of the block B1 (MS) (S78), and respectively writes the index "2" of the block B1 (MS) and the index "6" of the block B2 (MS) to the address words of the block B2 (MS) and the block B1 (MS) to form a link between the blocks B2, B1 (S78). As a result, the write destination block B1 is set as an unwritten block MP and is thus brought into the NULL state.

(WN2-3) FIG. 22 is a diagram illustrating the NULL write process WN2-3. As illustrated in FIG. 18, the NULL write process WN2-3 is used for a case where the write destination block B1 is a written block MS (MS in S73), a case where the boundary M-side adjacent block B2 is different from the write destination block B1 (NO in S74), and a case where the boundary M-side adjacent block B2 is an MP (MP in S77). The write process also includes setting the write destination block B1 (MS) as an unwritten block B1 (MP) (NULL state block), and thus, providing, in the W area, a link destination block WP for the write destination block B1 (MP).

The processor thus shifts the boundary to shrink the M area by one block (S76: shrink process). To set the link destination block B4 (WP) of the boundary M-side adjacent block B2 (MP) as a link destination of the write destination block B1 after NULL write to the write destination block B1 (MS), the processor further writes (shifts) the value "8" of the data word of the block B2 (MP) to the data word of the block B1 (MS) (S80), writes the index "10" of the block B4 (WP) to the address word of the block B1 (MS) (S80), and respectively writes the index "10" of the block B4 (WP) and index "2" of the block B1 (MS) to the address words of the block B1 (MS) and the block B4 (WP) to form a link between the blocks B1 and B4. That is, the link between the B2 and the B4 is replaced with the link between the B1 and the B4. As a result, the write destination block B1 is set as an unwritten block MP and is thus brought into the NULL state.

(WN3) As illustrated in FIG. 18, if the write destination block B1 is of the written block MS or WP type (MS or WP in S71), the processor sets, as the B2, the block in the M area adjacent to the boundary (S72), and if the write destination block B1 is of the WP type (WP in S73), executes the following NULL write WN3-1 to WN3-3.

(WN3-1) FIG. 23 is a diagram illustrating the NULL write process WN3-1. As illustrated in FIG. 18, the NULL write process WN3-1 is used for a case where the write destination block B1 is a WP (WP in S73) and where the boundary M-side adjacent block B2 is the same as the link destination block B3 of the write destination block B1 (YES in S82). In this case, the write process includes eliminating the link of the write destination block B1 (WP) to set the write destination block B1 as a WS.

The processor thus sets the link destination block of the write destination block B1 as the B3 (S81) and shifts the boundary to shrink the M area by one block (S76: shrink process). As a result, the write destination block B1 is set as an unwritten block WS and is thus brought into the NULL written state. The NULL write results in removal of one written block WP from the W area. The shrink process is thus executed to change the boundary M-side adjacent block MP (unwritten block) to a WS to remove the link between the B1 and the B2. This keeps the numbers of the WPs and the MPs equal to each other.

(WN3-2) FIG. 24 is a diagram illustrating the NULL write process WN3-2. As illustrated in FIG. 18, the NULL write process WN3-2 is used for a case where the write destination block B1 is a written block WP (WP in S73), a case where the boundary M-side adjacent block B2 is different from the link destination B3 of the write destination block B1 (NO in S82), and a case where the boundary M-side adjacent block B2 is an MS (MS in S83). In this case, the NULL write process WN3-2 includes setting the write destination block B1 (WP) as unwritten block B1 (WS), and thus, acquiring a new link destination block WP of the block B3 (MP) instead of the write destination block B1 (WP), which is the existing link destination of the block B3. Furthermore, the block B3 (MP) is present that is associated with the write destination block B1 (WP).

The processor thus sets the link destination block of the write destination block B1 as the B3 (S81). The processor then shifts the boundary to shrink the M area by one block (S76). To set the boundary M-side adjacent block B2 (MS) as a new link destination of the block B3 (MP), the processor further writes (shifts) the value "1" of the address word of the block B2 (MS) to the data word of the block B3 (MP) (S84), and respectively writes the index "2" of the block B3 (MP) and the index "6" of the block B2 (MS→WP) to the address words of the block B2 (MS→WP) and the block B3 (MP) to form a link between the blocks B3 and B2 (S83). That is, the processor replaces the link between the B3 and the B1 with the link between the B3 and the B2 to change the write destination block B1 to a WS, thus bringing the write destination block B1 into the NULL state. The link is maintained, and the numbers of WPs in the W area and MPs in the M area remain unchanged.

(WN3-3) FIG. 25 is a diagram illustrating the NULL write process WN3-3. As illustrated in FIG. 18, the NULL write process WN3-3 is used for a case where the write destination block B1 is a written block WP (WP in S73), a case where the boundary M-side adjacent block B2 is different from the link destination B3 of the write destination block B1 (NO in S82), and a case where the boundary M-side adjacent block B2 is an MP (MP in S83). In this case, the NULL write process WN3-3 includes setting the write destination block B1 (WP) as an unwritten block B1 (WS), thus removing the link between the B1 and the B3. The NULL write process consequently further includes acquiring a new link destination block WP (B4) of the MP block B3 (MP), instead of the write destination block B1 (WP), which is the existing link destination of the B3. Furthermore, the boundary M-side adjacent block B2 is an MP, and the shrink process is executed to remove the link of the boundary M-side adjacent block B2.

The processor thus sets the link destination block of the write destination block B1 as the B3 (S81). The processor then shifts the boundary to shrink the M area by one block (S76). To form a new link between the link destination B3 of the block B1 (WP) and the link destination B4 of the boundary M-side adjacent block B2 (MP), the processor further writes (shifts) the value "2" of the data word of the block B2 (MS) to the data word of the block B3 (MP) (S86), respectively writes the index "10" of the block B3 (MP) and the index "2" of the block B4 (WP) to the address words of the block B4 (WP) and the block B3 (MP) to form a link between the blocks B3, B4 (S86). That is, the processor eliminates the link between the B3 and the B1 and the link between the B2 and the B4 and forms a new link between the B3 and the B4. The processor consequently changes the write destination block B1 (WP) to a WS to bring the write destination block B1 into the NULL state, removing one link. This keep the numbers of WPs in the W area and MPs in the M area equal to each other.

[Specific Examples of the Initialization, Write, and Read]

Now, the initialization, the write, and the read will be described in accordance with specific examples. The specific examples described below illustrate that data write typically includes executing write on an unwritten block WS to increase the number of written blocks WP by one and increase the number of bidirectional links as well. Further, the specific examples described below illustrate that data write typically includes executing extend with a boundary W-side block WP to reduce the number of written blocks WP by one. The specific examples also illustrate that the extend increases the size of the M area while reducing the size of the W area. The specific examples further illustrate that a reduced size of the W area decreases the number of bidirectional links and thus the amount of management information. The specific examples also illustrate that the NULL write involves the shrink process and a change of the link to change a written block to an unwritten block to bring the written block into the NULL state.

FIG. 26 illustrates a specific example of the array AR, and the initialization. An array AR0 is an array that has an array length of 16 and in which one element (block) includes two words. The value "12" of the boundary pointer BD_P indicates that the boundary BD lies between an index 11 and an index 12. The values in the main area of the array are therefore undefined in the initial state where the value of the boundary pointer is "0". When the value of the boundary pointer is larger than "0", the written blocks MS, WP have true values, and the data in the unwritten blocks MP, WS is in the NULL state. For the block types MS, MP, WS, WP, no value is actually saved in the array. The block type may be calculated in a constant time based on the index i of the block, the boundary pointer BD_P, and the value of the address word in the block.

When the initialization "initialize(0)" is invoked, the processor rewrites, in the array AR1, the value of the boundary pointer BD_P with "0" (S1 in FIG. 5). Since the boundary pointer is set to "0", all the blocks are set as the unwritten block WS type (NULL state). Furthermore, all the indices have undefined values.

FIG. 27 is a diagram illustrating a specific example of the write 2-2 described in FIG. 16. The array AR2 is the same as the array AR1 in the initial state. In the array AR2, write "write(4, [0,9])" is invoked, and the processor writes the value [0,9] to the block with the index 4, as described below. In this write, the block on which the write is executed is of the unwritten block WS type, and the block in the W area adjacent to the boundary BD is of the WS type.

Thus, in the array AR3, the processor executes the extend "extend" to rewrite the boundary pointer BD_P with "2" to shift the boundary BD, generating an optional-value-written block MS (B2) (to which the optional value "0, 0" has been written) in the M area (S57). The extend "extend" is the process E1 in FIG. 11. The optional-value write process may be omitted. In an array AR4, the processor creates a bidirectional link between the write destination block B1 (WP) and the block MS (B2) (S60), and writes the write value "9" to the address word of the write destination block B1, while writing the write value "0" to the data word of the link destination block B2 (S56). Thus, when write is executed on an unwritten block WS different from the block in the W area that is adjacent to the boundary BD, the boundary is shifted to increase the size of the M area while reducing the size of the W area, with one additional bidirectional link formed.

FIG. 28 is a diagram illustrating a specific example of the write W2-2 described for FIG. 16. In an array AR5 (=AR4), write "write(10, [8,0])" is invoked, and the processor writes the value [8,0] to the block with the index 10. In this write, the block on which the write is executed is of the unwritten block WS type, and the block in the W area that is adjacent to the boundary BD is of the WS type.

Thus, in an array AR6, the processor executes the extend "extend" to rewrite the boundary pointer BD_P with "4" to shift the boundary BD, generating an optional-value-written block MS (B2) in the M area (S57). The extend "extend" is the process E1 in FIG. 11. In an array AR7, the processor creates a bidirectional link between the write destination block B1 and the optional-value-written block MS (B2) (S60). Since the write destination index 10 is a WP, the processor writes the write value "8" to the data word (index 3) of the link destination block B2 of the write destination block B1, while writing the write value "0" to the data word of the write destination block B1 (S56). As is the case with FIG. 27, when write is executed on an unwritten block WS different from the block in the W area that is adjacent to the boundary BD, the boundary is shifted to increase the size of the M area while reducing the size of the W area, with one additional bidirectional link formed.

Figure 29:
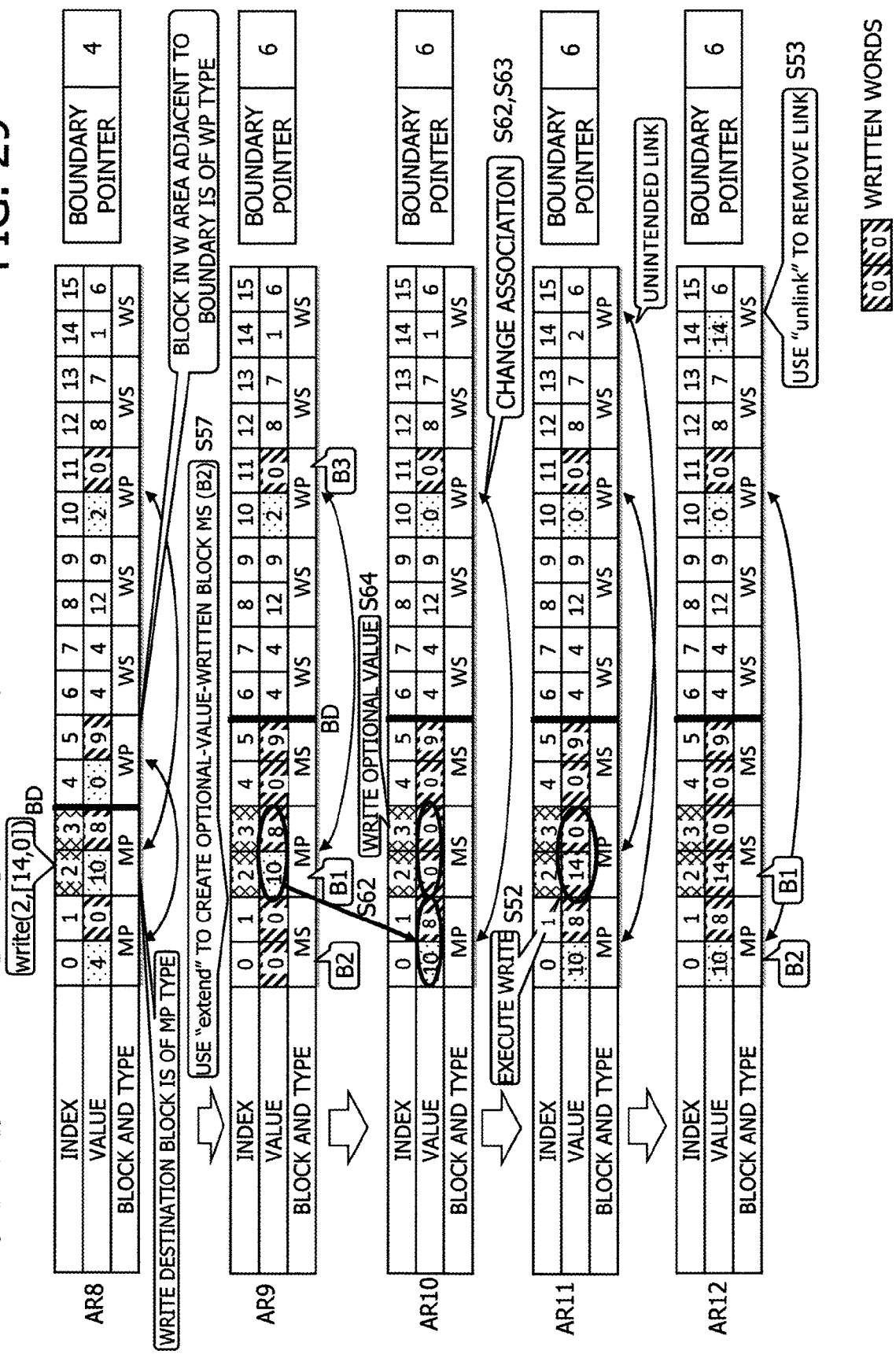
FIG. 29 is a diagram illustrating a specific example of the write W2-3 described with reference to FIG. 16.

FIG. 29 is a diagram illustrating a specific example of the write W2-3 described with reference to FIG. 17. In an array AR8 (=AR7), write "write(2, [14,0])" is invoked, and the processor writes the value [14,0] to the index 2. In this write, the block on which the write is executed is of the unwritten block MP type, and the block in the W area that is adjacent to the boundary BD is of the WP type.

Thus, in an array AR9, the processor executes the extend "extend" to rewrite the boundary pointer BD_P with "6" to shift the boundary BD, generating an optional-value-written block MS (B2) in the M area (S57). The extend "extend" is the process E2 in FIG. 12. In an array AR10, the processor writes the value [10,8] of the write destination block B1 (MP) to the optional-value-written block B2 (MS) (S62), and writes the index 0 of the B2 to the address word of the link destination block B3 (WP) of the write destination block B1 to change the bidirectional link between the blocks B2 and B3 (S63). An optional value is written to the write destination block B1, which thus changes to an optional-value-written block MS (S64). Subsequently, in an array AR11, the processor writes the write value [14,0] to the write destination block B1 (S52). In an array AR12, the processor removes the unintended link generated in the write destination block B1 (S53). In this case, the extend "extend" increases the size of the M area while reducing the size of the W area, and further removes one written block WP and one bidirectional link.

Figure 30:
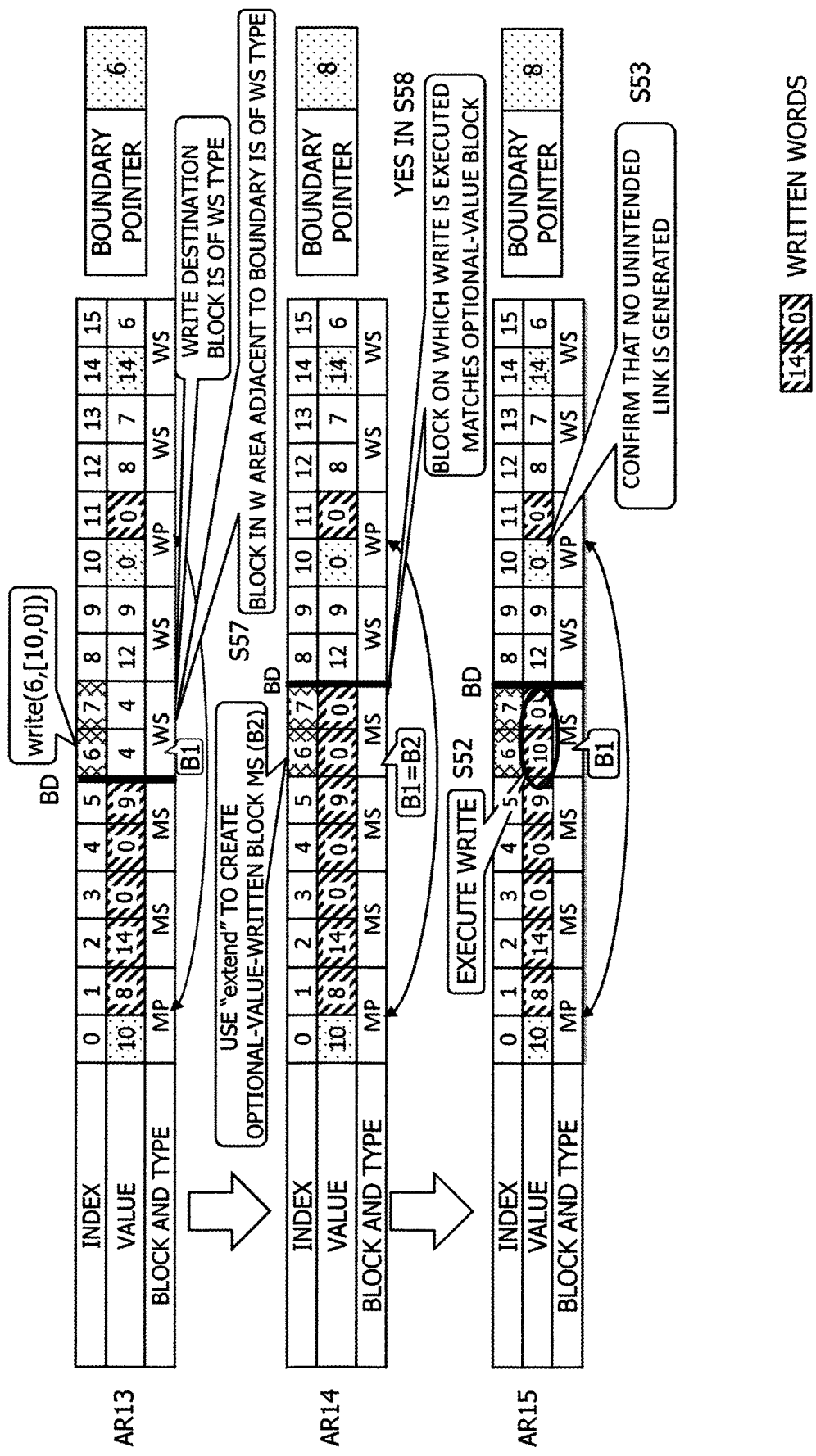
FIG. 30 is a diagram illustrating a specific example of the write W2-1 described for FIG. 16.

FIG. 30 is a diagram illustrating a specific example of the write W2-1 described for FIG. 15. In an array AR13 (=AR12), write "write(6, [10,0])" is invoked, and the processor writes the value [10,0] to the element with the index 6. In this write, the block on which the write is executed is of the unwritten block WS type, and the write destination block B1 is the same as the boundary W-side block B2.

Thus, in an array AR14, the processor executes the extend "extend" to rewrite the boundary pointer BD_P with "8" to shift the boundary BD, generating an optional-value-written block MS (B2) in the M area (S57). The extend "extend" is the process E1 in FIG. 12. In the array AR14, the write destination block B1 matches the optional-value-written block MS (B2) generated by the "extend" (YES in S58). Thus, in an array AR15, the processor writes the value [10,0] to the write destination block B1 (MS) (S52) and confirms that no unintended link is generated in the write destination block B1 (S53). In this case, the extend "extend" increases the size of the M area while reducing the size of the W area, and but leaves the numbers of unwritten blocks MP and written blocks WP unchanged and also leaves the number of bidirectional links unchanged.

Figure 31:
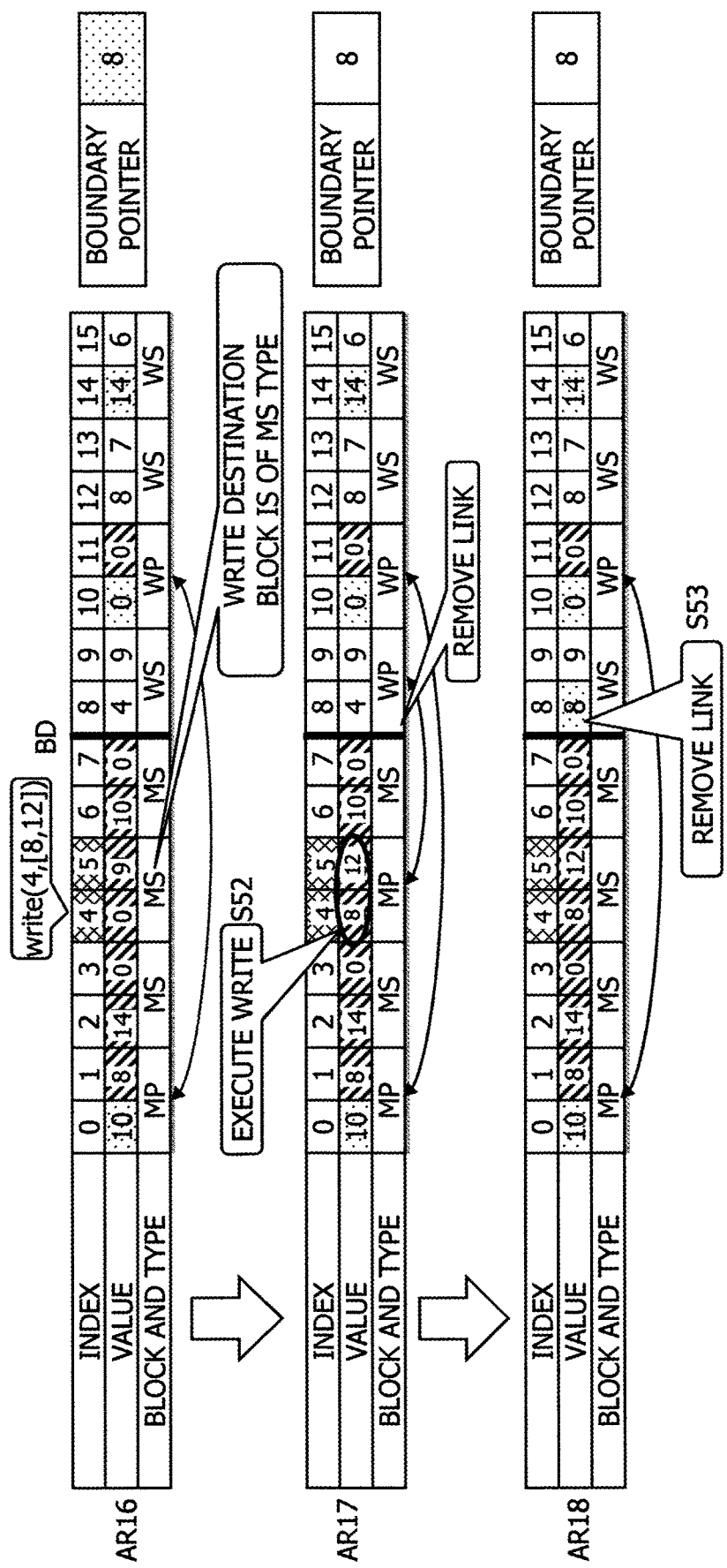
FIG. 31 is a diagram illustrating a specific example of the write W1 described with reference to FIG. 16.

FIG. 31 is a diagram illustrating a specific example of the write W1 described with reference to FIG. 14. In an array AR16 (=AR15), write "write(4, [8,12])" is invoked, and the processor writes the value [8,12] to the block with the index 4. In this write, the block on which the write is executed is of the written block MS type (MS in S51). The write is executed on the written block, and thus does not include generating an optional-value-written block MS by shifting the boundary using the extend "extend".

Thus, in an array AR17, the processor writes the value [8,12] to the write destination block B1 (MS) (S52). This write generates an unintended link between the write destination block B1 and the block with the index 8. Thus, in an array AR18, the index 8 of the block is written to the index 8 itself to remove the unintended link (S53). In this case, the sizes of the M area and the W area remain unchanged, the numbers of unwritten blocks MP and written blocks WP also remain unchanged, and the number of bidirectional links also remains unchanged.

As described above, repeated execution of the write on the array gradually shifts the boundary to increase the size of the M area. Immediately after the initialization, only a small number of bidirectional links are present, and thus, a small amount of management information (information on the bidirectional links) can be saved in the main area of the array in spite of a small number of blocks in the M area. Execution of the write on the unwritten blocks WS subsequently shifts the boundary to progressively increase the number of bidirectional links. However, the number of blocks in the M area also increases to allow an increased amount of management information (information on the bidirectional links) to be saved in the main area of the array. As the boundary approaches the maximum index of the W area, the number of bidirectional links is reduced, for example, by changing written blocks WP to unwritten blocks MS using the "extend". As a result, a reduced amount of management information can be saved in the main area in spite of a small number of blocks in the W area. In other words, hybridized management is executed that manages the number of unwritten blocks in the M area and the number of written blocks in the W area. Thus, the number of bidirectional links is small when the total number of writes is small at the initialization and when the total number of writes is large at the completion, whereas the number of bidirectional links is increased at the middle stage between the initialization and the completion, so that the management information on the bidirectional links can be saved in the array.

FIG. 32 is a diagram illustrating a specific example of three types of the read "read". In an array AR19 (=AR18), the read "read(0)" is invoked, and the processor reads the value of the index 1. The read destination block is of the unwritten block MP type (MP in S21), and thus, the processor reads and returns NULL (S22).

In an array AR20, the read "read(2)" is invoked, and the processor reads the value of the index 2. The read destination block is of the written block MS type (MS in S21), and thus, the processor reads and returns the value [14,0] of the index 2 (S23).

In an array AR21, the read "read(8)" is invoked, and the processor reads the value of the block with the index 8. The read destination block is of the unwritten block WS type (WS in S21), and thus, the processor reads and returns NULL (S22).

FIG. 33 is a diagram illustrating a specific example of one type of the read "read". In an array AR22 (=AR21), the read "read (10)" is invoked, and the processor reads the value of the index 10. The read destination block is of the written block WP type (WP in S21), and the processor reads and returns the value "8" (the value of the index 1) of the data word of the link destination unwritten block MP of the read destination block WP and the value "0" of the data word of the read destination block WP (S25).

Figure 34:
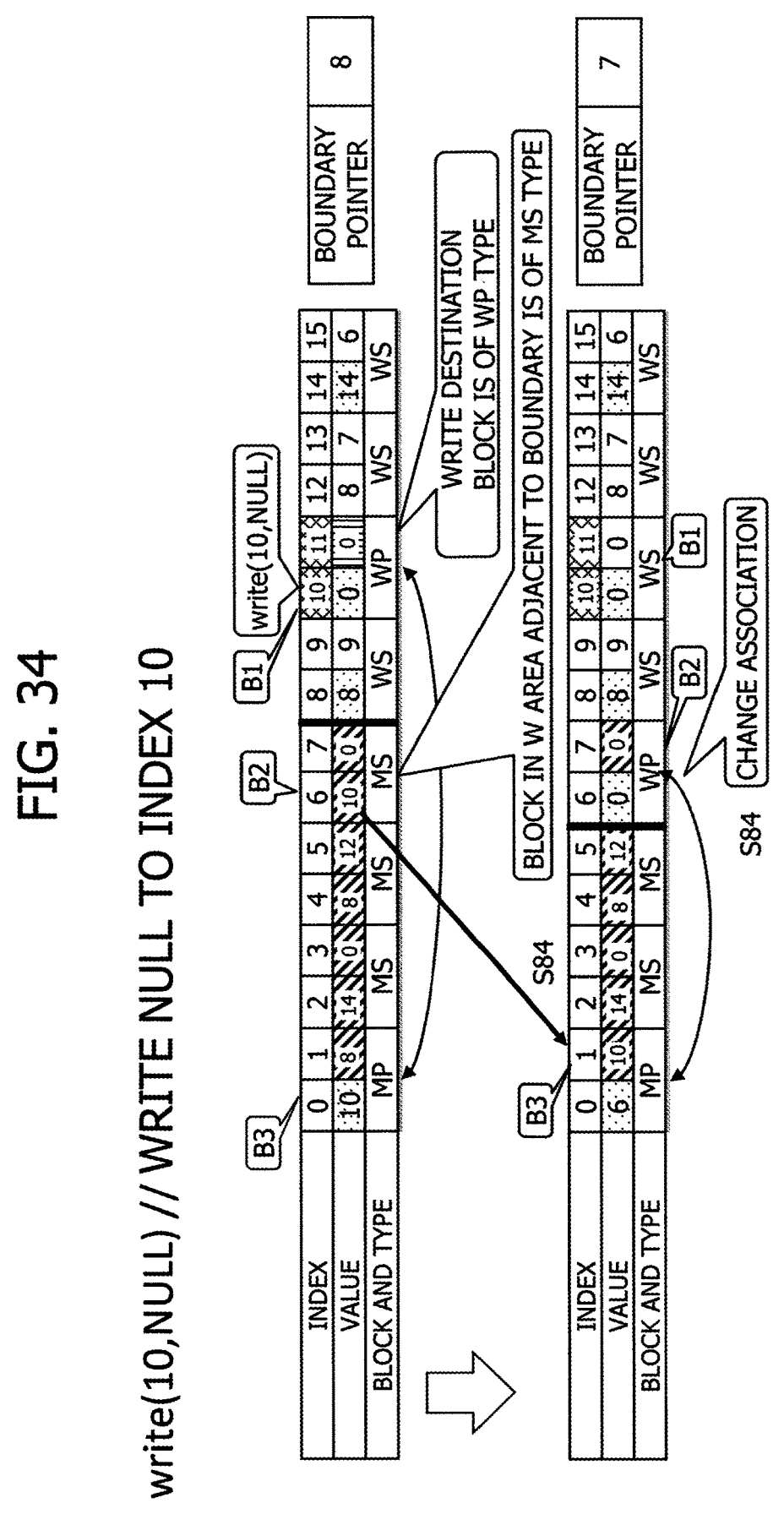

FIG. 34 is a diagram illustrating a specific example of the NULL write. In FIG. 34, NULL write "write(10, NULL)" is invoked. Therefore, the write destination block B1 is a WP, the boundary M-side adjacent block B2 is an MS, the B2 and the B1 are different blocks, and the NULL write WN3-2 process in FIG. 24 is executed.

The processor shifts the boundary to shrink the M area by one block (S76). To set the boundary M-side adjacent block B2 (MS) as a new link destination of the block B3 (MP), the processor further writes (shifts) the value "10" of the address word of the block B2 (MS) to the data word of the block B3 (MP) (S84), and respectively writes the index "0" of the block B3 (MP) and the index "6" of the block B2 (MS→WP) to the address words of the block B2 (MS→WP) and the block B3 (MP) to form a link between the blocks B3, B2 (S83). The write destination block B1 is thus changed to a WS and brought into the NULL state.

FIG. 36 is a diagram illustrating an additional memory capacity for storing the NULL state therein according to the embodiment. In the present embodiment, if each element of an array includes m bits, an array with an array length $N \leq 2^{(m/2)}$ may be extended into an optional array using an extra space of m/2 bits in which a boundary value is stored. Each element of the optional array may have $2^m$ types of normal data and one special state (NULL state). However, if the array length is larger than $2^{(m/2)}$, the extra space of m/2 bits is provided for each length of $2^{(m/2)}$. "^" means power.

The reason is as follows: if each element includes m bits, the address word of the element, corresponding to a smaller index, includes m/2 bits, and thus, the array length N, which is the number of elements of the array, is up to $2^{(m/2)}$. Thus, if the array length exceeds the maximum length of $2^{(m/2)}$, an appropriate number of arrays with an array length N of $2^{(m/2)}$ are provided, and each of the arrays includes an extra space of m/2 bits.

In the example illustrated in FIG. 36, if the element size m is 8 bits and the array length is 1,000, the present embodiment provides 63 arrays with an array length of 16 (=$2^{(8/2)}$) (1,000/16=62.5, hence 63) and an extra space of 8/2 bits (4 bits) for each of the 63 arrays. The total of the extra spaces is thus 63*4=252 bits.

In contrast, the flag method uses an extra space of N bits for each array length N. That is, the flag method uses a 1-bit flag for each element in association with an array length of 1,000, and thus, uses an extra space of 1,000 bits.

The escape method includes writing "FF FF" or "FF 00" to all the elements in the worst case, and thus, uses an extra space of 8,000 bits to store 8*2 bits in each element. That is, the escape method uses an extra space of m*N bits in the worst case for m-bit elements with an array length N.

Other element sizes and other array lengths may be similarly calculated.

A first aspect of the present invention allows a special state to be stored while suppressing an increase in the storage capacity of an array.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium storing therein an array control program causing a computer to execute a process, the process comprising:

obtaining an optional array from a memory, the optional array having an array and a boundary, the array consecutively forming a plurality of blocks each including a constant number of two or more words including at least an address word and a data word, the boundary indicating a two-division position where the plurality of blocks of the array is divided into divided areas, the boundary being a position where a ratio between the number of unwritten blocks in a first area of the divided areas and the number of written blocks in a second area of the divided areas is an integer ratio;

when a first write for writing a valid value to an unwritten block in the first area or an unwritten block in the second area is invoked, executing an extend process of shifting the boundary to extend the first area and generating an optional-value-written block in the first area;

in a case where a write destination block for the first write is not the same as the optional-value-written block generated by the extend process but is an unwritten block in the second area, executing a link process that includes storing an address of the write destination block in the second area, in an address word of the optional-value-written block in the first area generated by the extend process, and storing, in an address word of the write destination block in the second area, an address of the optional-value-written block in the first area generated by the extend process, to form a link; and writing the valid value to the write destination block in the second area;

when a second write for writing a special value in which a written block in the second area is the write destination block is invoked, executing a shrink process of shifting the boundary to shrink the first area, so as to shift, toward the second area side, a first adjacent block on the first area side adjacent to the boundary;

in a case where the first adjacent block is a written block, storing an address of the first adjacent block in an address word of a first link destination block forming a link with the write destination block, and storing an address of the first link destination block in an address word of the first adjacent block, to form a link, so as to eliminate an existing link of the write destination block to change the write destination block to an unwritten block; and in a case where the first adjacent block is an unwritten block, storing, in an address word of the first link destination block, an address of a second link destination block forming a link with the first adjacent block, and storing an address of the first link destination block in an address word of the second link destination block, to form a link, so as to eliminate an existing link of the write destination block to change the write destination block to an unwritten block.

2. The non-transitory computer-readable storage medium according to claim 1, wherein the process further includes:

when the second write in which a written block in the first area is the write destination block is invoked, executing the shrink process to shift, toward the second area side, the first adjacent block on the first area side adjacent to the boundary;

in a case where the first adjacent block is a written block, storing the address of the first adjacent block in the address word of the write destination block and storing the address of the write destination block in the address word of the first adjacent block to form a link, thus changing the write destination block to an unwritten block; and in a case where the first adjacent block is an unwritten block, storing, in the address word of the write destination block, the address of the second link destination block forming a link with the first adjacent block, and storing the address of the write destination block in the address word of the second link destination block, to form a link, thus changing the write destination block to an unwritten block.

3. The non-transitory computer-readable storage medium according to claim 1, the process further comprising:

initializing, when initialization is invoked, a position of the boundary in such a manner that all the blocks are set as unwritten blocks in the second area.

4. The non-transitory computer-readable storage medium according to claim 3, the process further comprising:

when read is invoked, returning the special value in a case where a read destination block is an unwritten block; and returning a value of the read destination block in a case where the read destination block is a written block.

5. The non-transitory computer-readable storage medium according to claim 1, the process further comprising:

determining whether an access destination is a block in the first area or a block in the second area, based on an access destination index and the boundary, and determining whether the access destination is an unwritten block in the first area or a written block in the second area, based on whether or not the access destination block forms the link.

6. The non-transitory computer-readable storage medium according to claim 1, the process further comprising:

when a value of a written block in the first area is changed and an unintended link is formed, executing an unlink process of changing the address word of an unwritten block in the second area is controlled so as to prevent formation of a link between the unwritten block in the second area and the written block in the first area.

7. The non-transitory computer-readable storage medium according to claim 1, the process further comprising:

when the second write with the write destination block being the written block in the second area is invoked, executing the shrink process in a case where the first adjacent block is the same as the first link destination block forming a link with the write destination block.

8. The non-transitory computer-readable storage medium according to claim 1, the process further comprising:

when the second write with the write destination block being a written block in the first area is invoked, executing the shrink process in a case where the first adjacent block is the same as the write destination block.

9. The non-transitory computer-readable storage medium according to claim 1, the process further comprising:

in a case where the write destination block for the first write is an unwritten block in the first area or an unwritten block in the second area and is the same as the optional-value-written block generated by the extend process, writing a valid value of the first write to the write destination block and executing unlink process of removing an unwanted link to the write destination block.

10. The non-transitory computer-readable storage medium according to claim 1, the process further comprising:

in a case where the write destination block for the first write is not the same as the optional-value-written block generated by the "extend" process and is an unwritten block in the first area, writing a value of the unwritten block in the first area, which is the write destination block, to the optional-value-written block in the first area generated by the extend process to generate a link between a written block in the second area that is a link destination of the unwritten block in the first area, which is the write destination block, and the optional-value-written block in the first area generated by the extend process, and writing a valid value of the first write to the unwritten block in the first area, which is the write destination block.

11. A method of controlling an optional array, the method comprising:

obtaining an optional array from a memory, the optional array having an array and a boundary, the array consecutively forming a plurality of blocks each including a constant number of two or more words including at least an address word and a data word, the boundary indicating a two-division position where the plurality of blocks of the array is divided into divided areas, the boundary being a position where a ratio between the number of unwritten blocks in a first area of the divided areas and the number of written blocks in a second area of the divided areas is an integer ratio;

when a first write for writing a valid value to an unwritten block in the first area or an unwritten block in the second area is invoked, executing an extend process of shifting the boundary to extend the first area and generating an optional-value-written block in the first area;

in a case where a write destination block for the first write is not the same as the optional-value-written block generated by the extend process but is an unwritten block in the second area, executing a link process that includes storing an address of the write destination block in the second area, in an address word of the optional-value-written block in the first area generated by the extend process, and storing, in an address word of the write destination block in the second area, an address of the optional-value-written block in the first area generated by the extend process, to form a link; and writing the valid value to the write destination block in the second area;

when a second write for writing a special value in which a written block in the second area is the write destination block is invoked, executing a shrink process of shifting the boundary to shrink the first area, so as to shift, toward the second area side, a first adjacent block on the first area side adjacent to the boundary;

in a case where the first adjacent block is a written block, storing an address of the first adjacent block in an address word of a first link destination block forming a link with the write destination block, and storing an address of the first link destination block in an address word of the first adjacent block, to form a link, so as to eliminate an existing link of the write destination block to change the write destination block to an unwritten block; and in a case where the first adjacent block is an unwritten block, storing, in an address word of the first link destination block, an address of a second link destination block forming a link with the first adjacent block, and storing an address of the first link destination block in an address word of the second link destination block, to form a link, so as to eliminate an existing link of the write destination block to change the write destination block to an unwritten block.

12. An optional array controlling device comprising:

a memory that stores an optional array including an array consecutively forming a plurality of blocks each including a constant number, which is two or more, of words including at least an address word and a data word, a boundary indicative of a two-division position where the plurality of blocks of the array is divided into divided areas, the boundary being a position where a ratio between the number of unwritten blocks in a first area of the divided areas and the number of written blocks in a second area of the divided areas is an integer ratio; and a processor coupled to the memory and the processor configured to:

when a first write for writing a valid value to an unwritten block in the first area or an unwritten block in the second area is invoked, execute an extend process of shifting the boundary to extend the first area and generating an optional-value-written block in the first area;

in a case where a write destination block for the first write is not the same as the optional-value-written block generated by the extend process but is an unwritten block in the second area, execute a link process that includes storing an address of the write destination block in the second area, in an address word of the optional-value-written block in the first area generated by the extend process, and storing, in an address word of the write destination block in the second area, an address of the optional-value-written block in the first area generated by the extend process, to form a link; and write the valid value to the write destination block in the second area;

when a second write for writing a special value in which a written block in the second area is the write destination block is invoked, executing a shrink process of shifting the boundary to shrink the first area, so as to shift, toward the second area side, a first adjacent block on the first area side adjacent to the boundary;

in a case where the first adjacent block is a written block, store an address of the first adjacent block in an address word of a first link destination block forming a link with the write destination block, and stores an address of the first link destination block in an address word of the first adjacent block, to form a link, so as to eliminate an existing link of the write destination block to change the write destination block to an unwritten block; and in a case where the first adjacent block is an unwritten block, store, in an address word of the first link destination block, an address of a second link destination block forming a link with the first adjacent block, and stores an address of the first link destination block in an address word of the second link destination block, to form a link, so as to eliminate an existing link of the write destination block to change the write destination block to an unwritten block.

\* \* \* \* \*